United States Patent
LeVee et al.

(10) Patent No.: US 10,417,018 B2
(45) Date of Patent: Sep. 17, 2019

(54) NAVIGATION OF IMMERSIVE AND DESKTOP SHELLS

(75) Inventors: Brian S. LeVee, Seattle, WA (US); Jesse Clay Satterfield, Seattle, WA (US); Chaitanya Dev Sareen, Seattle, WA (US); Jennifer Nan, Seattle, WA (US); Patrice L. Miner, Kirkland, WA (US); Alice P. Steinglass, Bellevue, WA (US); Tsz Yan Wong, Seattle, WA (US); Theresa B. Pittappilly, Redmond, WA (US); Raymond J. Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 13/118,163

(22) Filed: May 27, 2011

(65) Prior Publication Data

US 2012/0304102 A1 Nov. 29, 2012

(51) Int. Cl.
*G06F 3/048* (2013.01)
*G06F 9/451* (2018.01)
*G06F 3/0488* (2013.01)

(52) U.S. Cl.
CPC ............ *G06F 9/451* (2018.02); *G06F 3/0488* (2013.01)

(58) Field of Classification Search
CPC ....................................... G06F 3/0481–3/0484
USPC .................................................. 715/778, 779
See application file for complete search history.

(56) References Cited

U.S. PATENT DOCUMENTS

| | | | |
|---|---|---|---|
| 5,499,334 A * | 3/1996 | Staab .............................. | 715/778 |
| 5,561,757 A | 10/1996 | Southgate | |
| 5,564,002 A * | 10/1996 | Brown .......................... | 715/778 |
| 5,600,779 A | 2/1997 | Palmer et al. | |
| 5,666,498 A | 9/1997 | Amro | |
| 5,841,435 A * | 11/1998 | Dauerer et al. ............... | 715/775 |
| 5,889,517 A * | 3/1999 | Ueda et al. ................... | 715/803 |
| 6,043,817 A * | 3/2000 | Bolnick et al. ............... | 715/788 |
| 6,061,695 A * | 5/2000 | Slivka et al. ................. | 715/203 |

(Continued)

FOREIGN PATENT DOCUMENTS

| | | |
|---|---|---|
| CN | 101300621 | 11/2008 |
| CN | 101686280 A | 3/2010 |

(Continued)

OTHER PUBLICATIONS

Lo, Kevin., "How Virtualization Software can Turn One Computer into Several", Retrieved at «http://www.techsoup.org/learningcenter/software/page4826.cfm», Jan. 19, 2011, pp. 3.

(Continued)

*Primary Examiner* — Steven B Theriault
(74) *Attorney, Agent, or Firm* — Arent Fox LLP

(57) ABSTRACT

Desktop as an immersive application techniques are described. In one or more implementations, an immersive environment module is configured to provide an immersive shell through which a user may interact with applications of a computing device. The immersive environment module is further configured to provide a desktop shell within the immersive shell to support additional techniques for interaction with the application of the computing device. The desktop shell, for instance, may be configured for accessibility similar to that provided to applications in the immersive shell.

20 Claims, 17 Drawing Sheets

(56) References Cited

U.S. PATENT DOCUMENTS

| | | | |
|---|---|---|---|
| 6,269,409 B1 | 7/2001 | Solomon | |
| 6,278,448 B1* | 8/2001 | Brown et al. | 715/866 |
| 6,590,592 B1* | 7/2003 | Nason et al. | 715/778 |
| 6,630,943 B1 | 10/2003 | Nason et al. | |
| 6,639,606 B1 | 10/2003 | Choi | |
| 6,639,613 B1* | 10/2003 | Nason et al. | 715/778 |
| 6,661,435 B2* | 12/2003 | Nason et al. | 715/778 |
| 6,807,666 B1* | 10/2004 | Evans et al. | 718/108 |
| 6,819,345 B1* | 11/2004 | Jones et al. | 715/856 |
| 6,871,348 B1* | 3/2005 | Cooper | 719/310 |
| 7,010,755 B2* | 3/2006 | Anderson et al. | 715/778 |
| 7,250,955 B1 | 7/2007 | Beeman et al. | |
| 7,269,797 B1* | 9/2007 | Bertocci et al. | 715/783 |
| 7,281,202 B2* | 10/2007 | Croney et al. | 715/255 |
| 7,290,217 B2* | 10/2007 | Jones et al. | 715/764 |
| 7,376,907 B2* | 5/2008 | Santoro et al. | 715/765 |
| 7,424,601 B2 | 9/2008 | Xu | |
| 7,429,993 B2 | 9/2008 | Hui | |
| 7,595,810 B2 | 9/2009 | Louch | |
| 7,656,393 B2* | 2/2010 | King et al. | 345/173 |
| 7,681,134 B1* | 3/2010 | Grechishkin et al. | 715/740 |
| 7,810,096 B2 | 10/2010 | Saito et al. | |
| 7,895,537 B2* | 2/2011 | Gruen et al. | 715/863 |
| 8,175,653 B2* | 5/2012 | Smuga et al. | 455/566 |
| 8,239,785 B2* | 8/2012 | Hinckley et al. | 715/863 |
| 8,595,642 B1* | 11/2013 | Lagassey | 715/781 |
| 8,627,227 B2* | 1/2014 | Matthews et al. | 715/788 |
| 8,732,607 B1 | 5/2014 | Grechishkin et al. | |
| 8,850,351 B2 | 9/2014 | Beharie et al. | |
| 8,884,892 B2* | 11/2014 | Bakker | 345/173 |
| 8,924,885 B2 | 12/2014 | LeVee et al. | |
| 9,013,366 B2* | 4/2015 | Zheng et al. | 345/1.1 |
| 9,046,992 B2* | 6/2015 | Sirpal | |
| 2002/0080184 A1 | 6/2002 | Wishoff | |
| 2002/0196279 A1 | 12/2002 | Bloomfield et al. | |
| 2003/0052923 A1 | 3/2003 | Porter | |
| 2003/0112271 A1* | 6/2003 | Batalden et al. | 345/744 |
| 2003/0179240 A1* | 9/2003 | Gest | 345/779 |
| 2003/0184576 A1* | 10/2003 | Vronay et al. | 345/719 |
| 2003/0189597 A1* | 10/2003 | Anderson et al. | 345/778 |
| 2003/0210270 A1 | 11/2003 | Clow et al. | |
| 2004/0046799 A1 | 3/2004 | Gombert et al. | |
| 2004/0070608 A1 | 4/2004 | Saka | |
| 2004/0104929 A1* | 6/2004 | Chen et al. | 345/738 |
| 2004/0192440 A1* | 9/2004 | Evans et al. | 463/30 |
| 2004/0226041 A1 | 11/2004 | Smith et al. | |
| 2004/0268228 A1* | 12/2004 | Croney et al. | 715/505 |
| 2005/0039146 A1* | 2/2005 | Jones et al. | 715/856 |
| 2005/0039147 A1* | 2/2005 | Jones et al. | 715/856 |
| 2005/0044058 A1* | 2/2005 | Matthews et al. | 707/1 |
| 2005/0088447 A1* | 4/2005 | Hanggie et al. | 345/545 |
| 2005/0091181 A1* | 4/2005 | McKee et al. | 707/1 |
| 2005/0091225 A1* | 4/2005 | McKee et al. | 707/100 |
| 2005/0091667 A1* | 4/2005 | McKee et al. | 719/328 |
| 2005/0091670 A1* | 4/2005 | Karatal et al. | 719/328 |
| 2005/0093868 A1* | 5/2005 | Hinckley | 345/502 |
| 2005/0125739 A1* | 6/2005 | Thompson et al. | 715/778 |
| 2005/0210412 A1* | 9/2005 | Matthews et al. | 715/835 |
| 2005/0273466 A1 | 12/2005 | Yoon | |
| 2006/0010394 A1* | 1/2006 | Chaudhri et al. | 715/779 |
| 2006/0047797 A1* | 3/2006 | Brown et al. | 709/223 |
| 2006/0080571 A1 | 4/2006 | Ichinowatari | |
| 2006/0130072 A1 | 6/2006 | Rhoten et al. | |
| 2006/0168528 A1* | 7/2006 | Gruen | 715/744 |
| 2006/0168537 A1 | 7/2006 | Hochmuth et al. | |
| 2006/0190833 A1* | 8/2006 | SanGiovanni et al. | 715/767 |
| 2006/0224989 A1 | 10/2006 | Pettiross et al. | |
| 2006/0238517 A1* | 10/2006 | King et al. | 345/173 |
| 2006/0259873 A1* | 11/2006 | Mister | 715/781 |
| 2006/0288306 A1 | 12/2006 | Mahajan et al. | |
| 2007/0044029 A1* | 2/2007 | Fisher et al. | 715/762 |
| 2007/0050727 A1* | 3/2007 | Lewis-Bowen et al. | 715/779 |
| 2007/0078891 A1 | 4/2007 | Lescouet et al. | |
| 2007/0082707 A1* | 4/2007 | Flynt et al. | 455/564 |
| 2007/0101155 A1* | 5/2007 | Hoghaug et al. | 713/189 |
| 2007/0171921 A1 | 7/2007 | Wookey et al. | |
| 2007/0210908 A1 | 9/2007 | Putterman et al. | |
| 2008/0016461 A1 | 1/2008 | Hoblit | |
| 2008/0046832 A1 | 2/2008 | Balasubramanian | |
| 2008/0059893 A1 | 3/2008 | Byrne et al. | |
| 2008/0115081 A1 | 5/2008 | Sankaravadivelu et al. | |
| 2008/0155454 A1 | 6/2008 | Balasubramanian | |
| 2008/0155455 A1 | 6/2008 | Balasubramanian | |
| 2008/0184158 A1* | 7/2008 | Selig | 715/781 |
| 2008/0184159 A1* | 7/2008 | Selig | 715/781 |
| 2008/0276170 A1 | 11/2008 | Bonansea et al. | |
| 2008/0288606 A1 | 11/2008 | Kasai et al. | |
| 2008/0320025 A1* | 12/2008 | Ozzie et al. | 707/102 |
| 2009/0024956 A1 | 1/2009 | Kobayashi | |
| 2009/0031247 A1* | 1/2009 | Walter et al. | 715/788 |
| 2009/0070404 A1* | 3/2009 | Mazzaferri | 709/202 |
| 2009/0083655 A1 | 3/2009 | Beharie et al. | |
| 2009/0106691 A1* | 4/2009 | Ballard et al. | 715/798 |
| 2009/0138808 A1 | 5/2009 | Moromisato et al. | |
| 2009/0172103 A1 | 7/2009 | Tuli | |
| 2009/0204925 A1* | 8/2009 | Bhat et al. | 715/778 |
| 2009/0228779 A1* | 9/2009 | Williamson et al. | 715/233 |
| 2009/0248869 A1* | 10/2009 | Ghostine | 709/225 |
| 2010/0045705 A1* | 2/2010 | Vertegaal et al. | 345/661 |
| 2010/0050076 A1* | 2/2010 | Roth | 715/702 |
| 2010/0079392 A1 | 4/2010 | Chiang et al. | |
| 2010/0097322 A1* | 4/2010 | Hu et al. | 345/173 |
| 2010/0103124 A1* | 4/2010 | Kruzeniski et al. | 345/173 |
| 2010/0248787 A1* | 9/2010 | Smuga et al. | 455/566 |
| 2010/0269060 A1* | 10/2010 | Bandholz et al. | 715/778 |
| 2010/0302172 A1* | 12/2010 | Wilairat | 345/173 |
| 2010/0313165 A1* | 12/2010 | Louch et al. | 715/792 |
| 2010/0318770 A1 | 12/2010 | Lin et al. | |
| 2010/0325405 A1 | 12/2010 | Laue | |
| 2011/0047459 A1* | 2/2011 | Van Der Westhuizen | 715/702 |
| 2011/0078624 A1* | 3/2011 | Missig et al. | 715/802 |
| 2011/0107272 A1 | 5/2011 | Aguilar | |
| 2011/0119684 A1* | 5/2011 | Suggs et al. | 719/313 |
| 2011/0138295 A1* | 6/2011 | Momchilov et al. | 715/740 |
| 2011/0167342 A1* | 7/2011 | de la Pena et al. | 715/702 |
| 2011/0202872 A1 | 8/2011 | Park | |
| 2011/0234522 A1* | 9/2011 | Lin et al. | 345/173 |
| 2011/0246904 A1* | 10/2011 | Pinto et al. | 715/740 |
| 2012/0066591 A1* | 3/2012 | Hackwell | 715/702 |
| 2012/0084737 A1* | 4/2012 | Gimpl et al. | 715/863 |
| 2012/0098766 A1* | 4/2012 | Dippel et al. | 345/173 |
| 2012/0159382 A1* | 6/2012 | Matthews et al. | 715/788 |
| 2012/0159383 A1* | 6/2012 | Matthews et al. | 715/788 |
| 2012/0159395 A1* | 6/2012 | Deutsch et al. | 715/835 |
| 2012/0167008 A1* | 6/2012 | Zaman et al. | 715/814 |
| 2012/0304103 A1 | 11/2012 | LeVee et al. | |
| 2012/0304106 A1 | 11/2012 | LeVee et al. | |
| 2013/0042201 A1* | 2/2013 | Sandman et al. | 715/781 |
| 2015/0121399 A1 | 4/2015 | LeVee et al. | |

FOREIGN PATENT DOCUMENTS

| | | |
|---|---|---|
| CN | 101978366 A | 2/2011 |
| JP | 2006091343 | 4/2006 |
| JP | 2009025920 | 9/2009 |
| JP | 2010108190 | 5/2010 |
| JP | 05265901 | 8/2013 |
| WO | WO-2010024820 | 3/2010 |

OTHER PUBLICATIONS

Chandrashekhar., "How to Run Multiple Operating System Simultaneously|VMwarePlayer", Retrieved at «http://techchand.org/671/how-to-run-multiple-operating-system-simultaneouslyvmwareplayer», 2009, pp. 6.

"Virtual PC 2007: Run multiple Operating Systems without Multibooting", Retrieved at «http://windows.microsoft.com/en-US/windows-vista/Virtual-PC-2007-Run-multiple-operating-systems-without-multibooting», Retrieved Date: May 18, 2011, pp. 3.

"How to Run Multiple OS Simultaneously on a PC", Retrieved at «http://itinyourhand.blogspot.com/2011/02/how-to-run-multiple-os-simultaneously.html», Feb. 28, 2011, pp. 2.

(56) References Cited

OTHER PUBLICATIONS

"International Search Report", dated May 24, 2012, Application No. PCT/US2011/055526, Filed Date: Oct. 9, 2011, pp. 8.
"International Search Report", dated Jun. 1, 2012, Application No. PCT/US2011/055527, Filed Date: Oct. 9, 2011, pp. 10.
"International Search Report", dated Apr. 27, 2012, Application No. PCT/US2011/055525, Filed Date: Oct. 9, 2011, pp. 9.
"Final Office Action", U.S. Appl. No. 13/118,132, (dated Aug. 27, 2013), 43 pages.
"Non-Final Office Action", U.S. Appl. No. 13/118,132, (dated Mar. 13, 2013), 31 pages.
"Non-Final Office Action", U.S. Appl. No. 13/118,213, (dated Mar. 1, 2013), 12 pages.
"Extended European Search Report", EP Application No. 11866999.3, dated Oct. 9, 2014, 6 pages.
"Notice of Allowance", U.S. Appl. No. 13/118,132, dated Aug. 20, 2014, 8 pages.
"Corrected Notice of Allowance", U.S. Appl. No. 13/118,132, dated Dec. 3, 2014, 2 pages.
"Extended European Search Report", EP Application No. 11868537.9, dated Nov. 24, 2014, 6 pages.
"Final Office Action", U.S. Appl. No. 13/118,213, dated Dec. 5, 2013, 19 pages.
"Non-Final Office Action", U.S. Appl. No. 13/118,213, dated Jul. 2, 2015, 21 pages.
"First Office Action and Search Report Received for Chinese Patent Application No. 201180071199.1", dated Jul. 31, 2015, 14 Pages.
"Office Action Received for Japanese Patent Application No. 2014-512825", dated Oct. 13, 2015, 4 Pages. (W/o English Translation).
"Pocket PC fan Windows 7", Published on: Apr. 1, 2010, 7 Pages.
Office Action Issued in Chinese Patent Application No. 201180071191.5, a foreign counterpart to U.S. Appl. No. 14/555,247, dated Feb. 3, 2016, 17 Pages.
Office Action Issued in European Patent Application No. 11866999.3, a foreign counterpart to U.S. Appl. No. 14/555,247, dated Feb. 2, 2016, 4 Pages.
Office Action Issued in European Patent Application No. 11868537.9, a foreign counterpart to U.S. Appl. No. 13/118,213, dated Feb. 4, 2016, 4 Pages.
Final Office Action Issued in U.S. Appl. No. 13/118,213, dated Mar. 18, 2016, 24 Pages.
Thurrott, et al., "Windows 7 Secrets" Published by John Wiley & Son, Sep. 8, 2009, 132 Pages.
"Office Action Issued in Japanese Patent Application No. 2014-518536", dated Oct. 13, 2015, 3 Pages. (W/O English Translation).
Akutsu, Yoshikazu, "Mastering Basic Operations Before Release! Complete Preemptive Guide to Windows 7," Aug. 1, 2009, Mainchi Communications Inc., vol. 16, Issue 9, 5 pages.
A translated Office Action from the Japan Patent Office for Application No. 2014-512825, dated Mar. 15, 2016, a counterpart foreign application of U.S. Appl. No. 14/555,247, 6 pages.

Translated Office Action from the Japan Patent Office for Application No. 2014-518536, dated Mar. 22, 2016, a counterpart foreign application of U.S. Appl. No. 13/118,213, 6 pages.
Mizuno, Hazime, "Just About to Release! Ubuntu 11.04 'Natty Narwhal' The Lastest Desktop Review," May 18, 2011, in 243rd Issue of the Magazine, vol. 313, Software Design, Japan, Gijutsu-Hyohron Co., Ltd., 12 pges.
Translated Second Office Action from the State Intellectual Property Office of China for Application No. 201180071199.1, dated Mar. 21, 2016, a counterpart foreign application of U.S. Appl. No. 13/118,213, 13 pages.
"Forceware Graphics Drivers nView 3.0 Desktop Manager, User Guide", in Publication of NVIDIA Corporation, Dec. 2003, 197 Pages.
"Shell Computing", Retrieved From: https://en.wikipedia.org/w/index.php?title=Shell_(computing)&oldid=413141572, Feb. 2011, 7 Pages.
"Office Action Issued in Korean Patent Application No. 10-2013-7031546", dated Aug. 10, 2017, 13 Pages.
"Office Action Issued in Korean Patent Application No. 10-2013-7031548", dated Oct. 31, 2017, 11 pages.
"Office Action Issued in Korean Patent Application No. 10-2018-7022045", dated Oct. 30, 2018, 10 Pages.
"Office Action Issued in European Patent Application No. 11866999.3", dated Jun. 26, 2018, 4 Pages.
"Office Action Issued in European Application No. 11868537.9", dated Jun. 28, 2018, 4 Pages.
"Non Final Office Action Issued in U.S. Appl. No. 13/118,213", dated Jan. 17, 2017, 31 Pages.
"Final Office Action Issued in U.S. Appl. No. 14/555,247", dated Oct. 23, 2017, 53 Pages.
"Final Office Action Issued in U.S. Appl. No. 14/555,247", dated Dec. 17, 2018, 38 Pages.
"Final Office Action Issued in U.S. Appl. No. 14/555,247", dated Sep. 29, 2016, 56 Pages.
"Non Final Office Action Issued in U.S. Appl. No. 14/555,247", dated Apr. 20, 2016, 10 Pages.
"Non Final Office Action Issued in U.S. Appl. No. 14/555,247", dated Jul. 20, 2018, 37 Pages.
"Non Final Office Action Issued in U.S. Appl. No. 14/555,247", dated Apr. 4, 2017, 65 Pages.
"Fifth Office Action Issued in Chinese Patent Application No. 201180071199.1", dated Jun. 23, 2017, 14 Pages.
"Fourth Office Action Issued in Chinese Patent Application No. 201180071199.1", dated Mar. 30, 2017, 7 Pages.
"Office Action issued in Chinese Patent Application No. 201180071199.1", dated May 23, 2018, 6 Pages.
"Third Office Action Issued in Chinese Patent Application No. 201180071199.1", dated Sep. 29, 2016, 12 Pages.

* cited by examiner

NAVIGATION OF IMMERSIVE AND DESKTOP SHELLS

BACKGROUND

Users have access to computing devices that may assume a wide variety of configurations. For example, the first computing devices that were traditionally available to common users were configured as desktop personal computers. Users typically interacted with these first computing devices using a keyboard and later a mouse to view data on a monitor.

Computing devices continued to evolve as users desired to interact with the devices in an increasing variety of circumstances. One such example was mobile phones that evolved from basic telephone functionality to the ability to run applications. Another such example is a slate computer, which may also be referred to as a tablet. Both of these examples are configured to be held by a user during interaction and thus techniques were developed to address this configuration.

Because of the different configurations of the computing devices, however, a variety of different techniques may be employed for interaction. Thus, even typical users may be confronted with a wide range a different techniques, even to utilize matching functionality of the devices, which could lead to user frustration and even cause the users to forgo use of computing devices having the different configurations.

SUMMARY

Desktop as an immersive application techniques are described. In one or more implementations, an immersive environment module is configured to provide an immersive shell through which a user may interact with applications of a computing device. The immersive environment module is further configured to provide a desktop shell within the immersive shell to support additional techniques for interaction with the application of the computing device. The desktop shell, for instance, may be configured for accessibility similar to that provided to applications in the immersive shell.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The diversity of computing devices with which a user interacts even in a typical day is growing rapidly. However, conventional techniques via which a user interacted with the devices were often optimized for these configurations. Thus, different techniques could be employed by different computing device configurations, even to access matching functionality. Additionally, development of new configurations could confound users due to the new ways in which a user could interact with the device, which could even result in a user forgoing interaction with unfamiliar device configurations.

A desktop as an immersive application is described. In one or more implementations, an operating system may support an immersive shell via which a user may interact with applications and consequently data of a computing device that implements the shell. For example, the immersive shell may be configured to consume a significant amount of a display area of a display device and limit and even forgo use of "chrome," (e.g., representations of controls such as menu bars), support scrolling and navigation techniques that may be well suited to slate computer configurations as well as other configurations, such as a traditional desktop computer.

The operating system may also support a desktop shell that is configured for navigation through a hierarchical file system using windows that contain folders, icons, and so on. In this example, the desktop shell is accessible within the immersive shell similar to how other applications are accessed in the immersive shell. Thus, the functionality of the desktop shell may be made readily accessible via the immersive shell to provide a user with a variety of different techniques to navigate through applications and files of the computing device. For example, a user may interact with the immersive shell to access applications using a computing device in a configuration of a slate computer and may also access the desktop to gain access to other functionality in a traditional manner that is readily understood by the user. Further, these techniques may be utilized to efficiently manage resources of the computing device. For example, these techniques may be used to conserve resources (e.g., power, processing, and memory) in the immersive shell yet provide access to additional resources when accessing the desktop shell through the immersive shell. Further discussion of the desktop as an immersive application may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
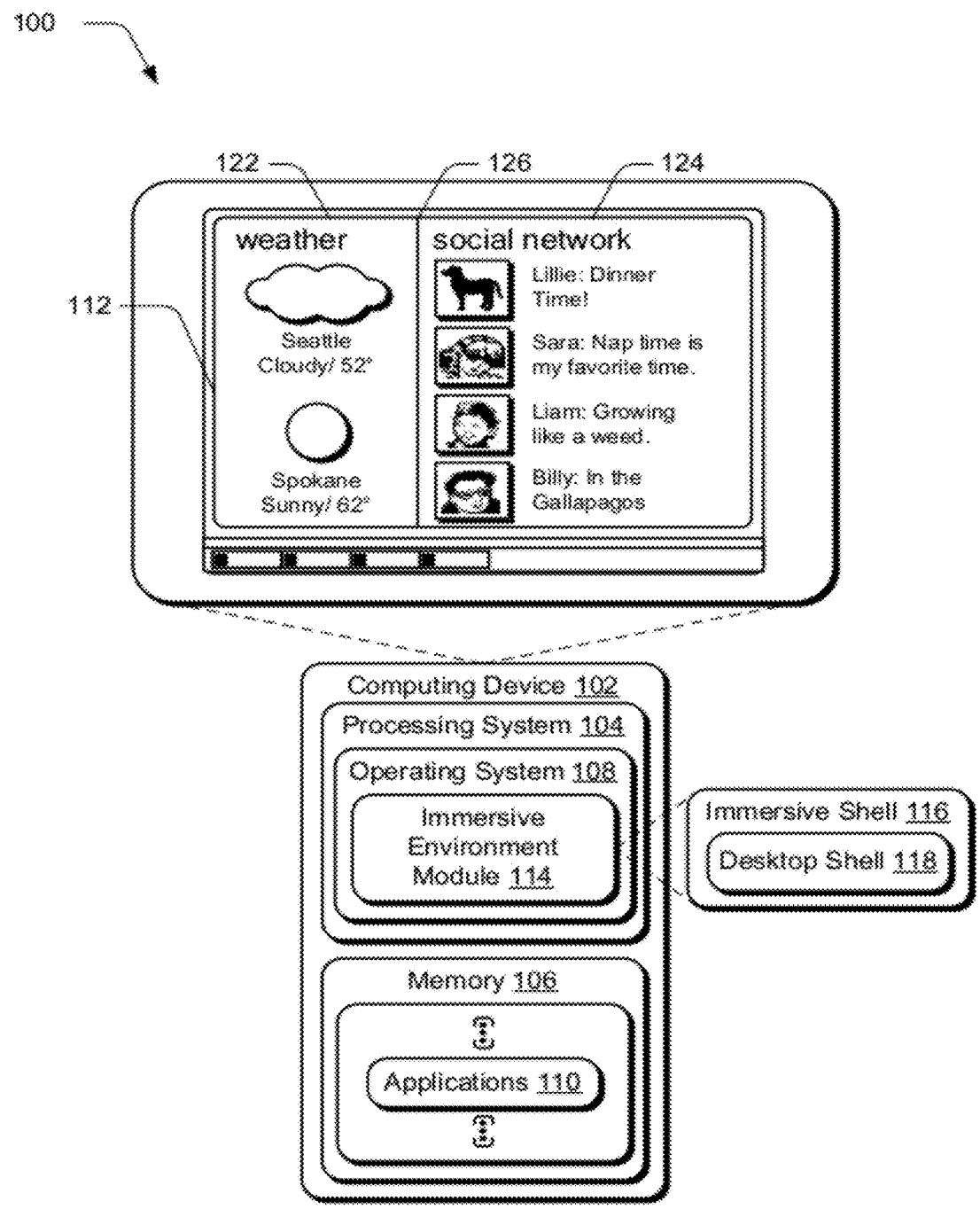
FIG. 1 is an illustration of an environment in an example implementation that is operable to implement immersive shell techniques described herein.

FIG. 1 is an illustration of an environment 100 in an example implementation that is operable to employ techniques described herein. The illustrated environment 100 includes a computing device 102 having a processing system 104 and a computer-readable storage medium that is illustrated as a memory 106 although other confirmations are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, network, and/or display device 112 functionality of the computing device 102 such that the applications 110 may be written without knowing "how" this underlying functionality is implemented. The application 110, for instance, may provide data to the operating system 108 to be rendered and displayed by the display device 112 without understanding how this rendering will be performed. The operating system 108 may also represent a variety of other functionality, such as to manage a file system and user interface that is navigable by a user of the computing device 102.

The operating system 108 is also illustrated as including an immersive environment module 114 which is representative of functionality of the computing device 102 to provide an immersive shell 116 via which a user may interact with the applications 110 and other data of the computing device 102, both local to the device as well as remotely via a network. The immersive shell 116 is configured to accept inputs to interact with the operating system 108 and applications 110 of the computing device 102 to access functionality of the computing device 102, such as the abstracted functionality described above. The immersive shell 116 may also be configured to support a desktop shell 118 as further described below.

The immersive shell 116 may be configured to support interaction with the applications 110 with little to no window frame. Additionally, the immersive shell 116 may support interaction with the applications 110 without requiring the user to manage a corresponding window frame's layout, primacy of the window with respect to other windows (e.g., whether a window is active, in front of behind other windows, an order of the windows, and so on). Although illustrated as part of the operating system 108, the immersive environment module 114 may be implemented in a variety of other ways, such as a stand-alone module, remotely via a network, and so forth.

In one or more implementations, the immersive shell 116 of the operating system 108 is configured such that it is not closeable or capable of being uninstalled apart from the operating system 108. Additionally, the immersive shell 116 may be configured to consume a significant portion of an available display area of the display device 112. A user may interact with the immersive shell 116 in a variety of ways, such as via a cursor control device, using one or more gestures, using speech recognition, capture using one or more depth-sensing cameras, and so on.

Thus, the immersive environment module 114 may manage the immersive shell 116 in which content of applications 110 may be presented and the presentation may be performed without requiring a user to manage size, location, primacy, and so on of windows used to display the content of the applications 110.

For example, as shown on a user interface displayed by the display device 112, a user interface is shown that is configured to display data 122, 124 from two applications in a "snapped" configuration. In this example, both of the applications that correspond to the data are enable to actively execute by the computing device 102 while execution is suspended for other of the applications 110 that do not currently display data. A gutter 126 is disposed between the displays of the data 122, 124 that may be moveable to change an amount of display area consumed by applications on the display device 112, respectively.

The immersive shell 116 may support a wide variety of functionality to provide an immersive experience for a user to access the applications 110. In the following discussion, this functionality is discussed in relation to leveraging these techniques to enable interaction with a desktop shell 118. It should be readily apparent, however, that these techniques may be employed for managing interaction with the applications 110 themselves without departing from the spirit and scope thereof.

As illustrated, the immersive shell 104 includes a desktop shell 118. The desktop shell 118 is representative of another configuration of a user interface output by the operating system 108 when in this example is to interact with the applications 110 and other data. For example, the desktop shell 118 may be configured to present applications and corresponding data through windows having frames. These frames may provide controls through which a user may interact with an application as well as controls enabling a user to move and size the window. The desktop shell 118 may also support techniques to navigate through a hierarchical file structure through the use of folders and represent the data and applications through use of icons. In one or more implementations, the desktop shell 118 may also be utilized to access applications 110 that are configured specifically for interaction via the desktop shell 118 and not configured for access via the immersive shell 116, although other implementation are also contemplated.

In one or more of the techniques described herein, the immersive shell 104 provides access to the desktop shell 118 as if the desktop shell 118 was another application that was executed on the computing device 102. In this way, a user may utilize the functionality of the immersive shell 116 yet still access the desktop shell 118 for more traditional functionality. Examples of implementation of the desktop as an immersive application within the immersive shell may be found in relation to the following figures.

Generally, any of the functions described herein can be implemented using software, firmware, hardware (e.g., fixed logic circuitry), or a combination of these implementations. The terms "module," "functionality," and "engine" as used herein generally represent software, firmware, hardware, or a combination thereof. In the case of a software implementation, the module, functionality, or engine represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
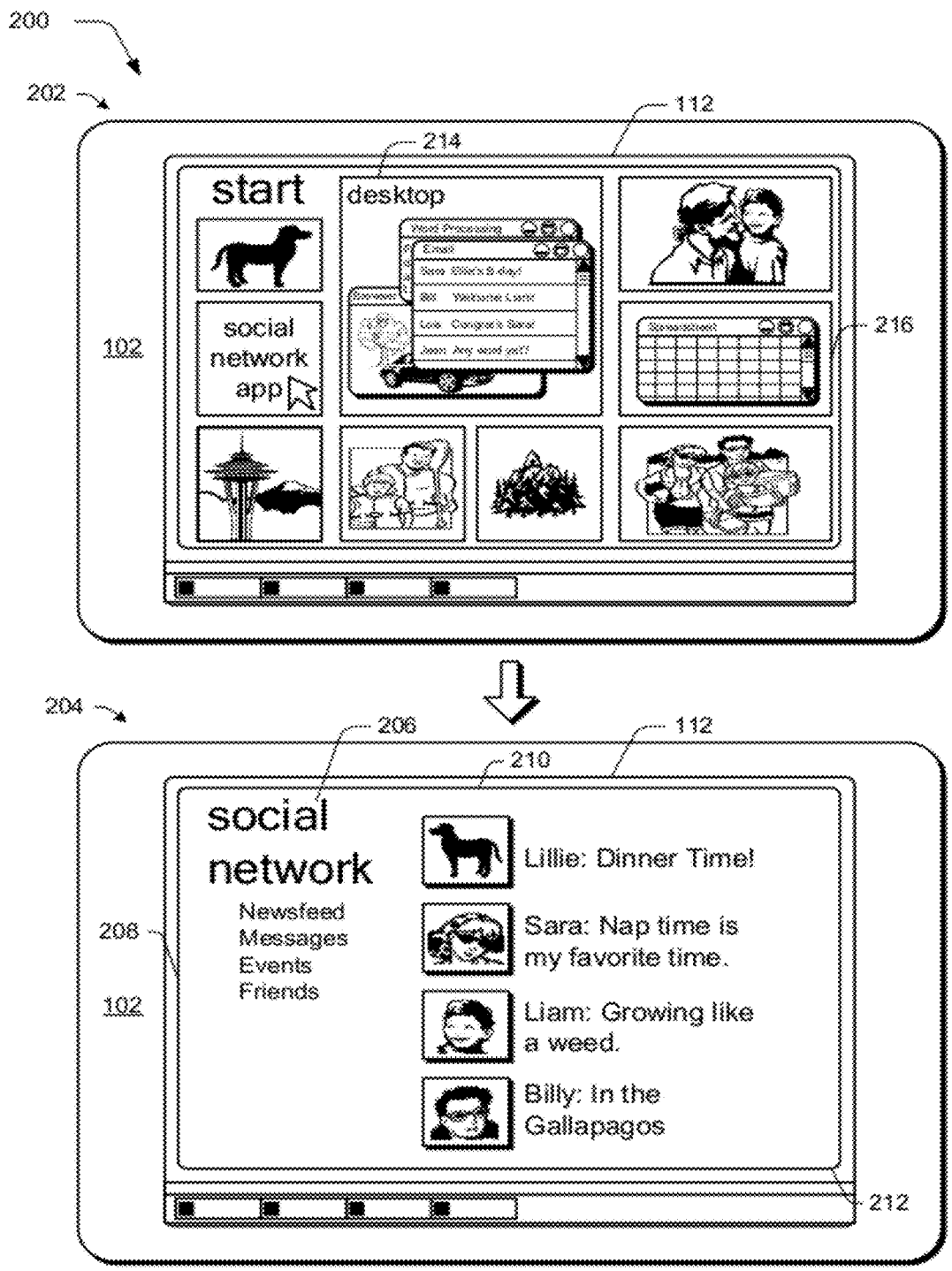
FIG. 2 illustrates a system in an example implementation of a computing device of FIG. 1 as supporting launching of applications in an immersive shell through selection of representations of the applications configured as tiles.

FIG. 2 illustrates a system 200 in an example implementation of the computing device 102 of FIG. 1 as supporting launching of applications into an immersive environment through selection of representations of the applications configured as tiles. The system 200 is illustrated as including first and second stages 202, 204. At the first stage 202, the computing device 102 is illustrated as outputting a start screen of the immersive shell 116. The start screen includes a plurality of tiles that represent applications that are selectable for execution by the computing device 102. A variety of other representations are also contemplated without departing from the spirit and scope thereof as previously described.

Selection of the tiles may be accomplished in a variety of ways. For example, a user may utilize a cursor control device, such as a mouse or track pad, to navigate a cursor to be displayed "over" a tile to be selected and "click" the tile to indicate the selection. As illustrated at the first stage 202, for instance, a cursor is shown as disposed over a tile of a social network app. In another example, gestures may be supported by the computing device 102, such as by tapping a desired representation to launch a corresponding application.

Responsive to the selection, the corresponding application 110 may be launched for execution by the computing device 102. An example of this is illustrated at the second stage 204 in FIG. 2 in which the social network application is launched into the immersive shell 116. The social network application is illustrated as providing a user interface 206 that consumes approximately an entirety of a display area of the display device 112. Additionally, the user interface 206 as illustrated does not include a window or "chrome" that is displayed along with the data of the application.

This technique may be repeated to launch a plurality of applications 110 for execution by the computing device 102. For example, a user may return to the start screen illustrated in the first stage 202 and select additional applications for execution, such as through selecting a "start" selection in a menu 804 of commands (e.g., "charms") as illustrated and further described in relation to FIG. 8. Responsive to each selection, additional user interfaces may be output that substantially consume the available display area of the display device.

A user may then navigate through the applications that have been selected for execution in a variety of ways. For example, a user may interact with a left edge 208 of the display device to cause the display of the social network application to be replaced with a display that corresponds to another application that was launched by the user.

As before, this interaction may be performed in a variety of ways, such as through maneuvering a cursor proximal to the left edge 208, a "swipe" gesture involving the left edge 208, and so on. This replacement may be performed non-modally by automatically cycling through the applications, modally through output of a menu having representations of the selected applications 110, and so on. Although interaction with the left edge 208 is described for navigation through the applications 110, it should be readily apparent that different edges may be utilized as well as different navigation techniques without departing from the spirit and scope thereof.

Other functionality may also be supported in the immersive shell 116. For example, interaction with the top or bottom edges 210, 212 may cause output of a menu (e.g., through a gesture and/or cursor control device) that is customized for an application 110 that is currently being displayed in the immersive shell 116. In other words, the menu may include commands that are specified by the application 110 for inclusion in the menu, e.g., that may involve interaction with the application as well as other functionality.

The immersive shell 116 may also support "snapping" of user interfaces of applications to support display of data from a plurality of the applications 110. As shown and described previously in relation to FIG. 1, for instance, data from weather and social network applications may be displayed concurrently on the display device 112. This data may be separated by a gutter 126 that is configured to adjust an amount of display area of the display device that is consumed by the respective applications. A variety of other immersive shell 116 functionality may also be supported by the immersive environment module 114, further examples of which may be found in relation to the following figures.

As described previously, the immersive environment module 114 may also support access to a desktop shell 118 as if the desktop shell 118 were an application of the computing device 102. An example of this is illustrated as a tile 214 that is representative of the desktop shell 118. The tile 214 in this instance is configured to display one or more windows that are saved as part of the state in the desktop shell 118. In other words, the tile 214 represents at least part of a user interface that would be output upon selection of the tile 214.

Additionally, the tile 214 may be configured to support selection of a view of the desktop itself as well as particular windows included in the representation. For example, a user may select an area within the tile 214 that is outside of the windows in the tiles to cause output of the desktop, such as through a cursor control device, gesture, and so on. Additionally, a user may select a particular window within the tile 214 to navigate directly to that window in the desktop shell 118, again which may be performed using a cursor control device, gesture, and so on. Thus, the desktop shell 118 may be represented in a manner that mimics representation of other applications in the start screen. Further, the tile 214 may be utilized to navigate directly to applications that are accessible within the desktop shell 118. Although not shown, launching of the desktop shell 118 may include output of a "splash" screen similar to a splash screen involved in the launching of an application 110.

Other tiles may also be included to navigate directly to applications 110 and/or particular data that is to be processed in conjunction with the applications 110. An example of this is illustrated by a tile 216 that corresponds to a particular spreadsheet to be output by a spreadsheet application. By selecting this tile 216, the spreadsheet application may be launched within a desktop shell 118 to include particular data, such as an office expense spreadsheet. Other examples are also contemplated, such as to navigate to particular files for processing by a word processing application, presentation application, photo editing application, and so on.

Figure 3:
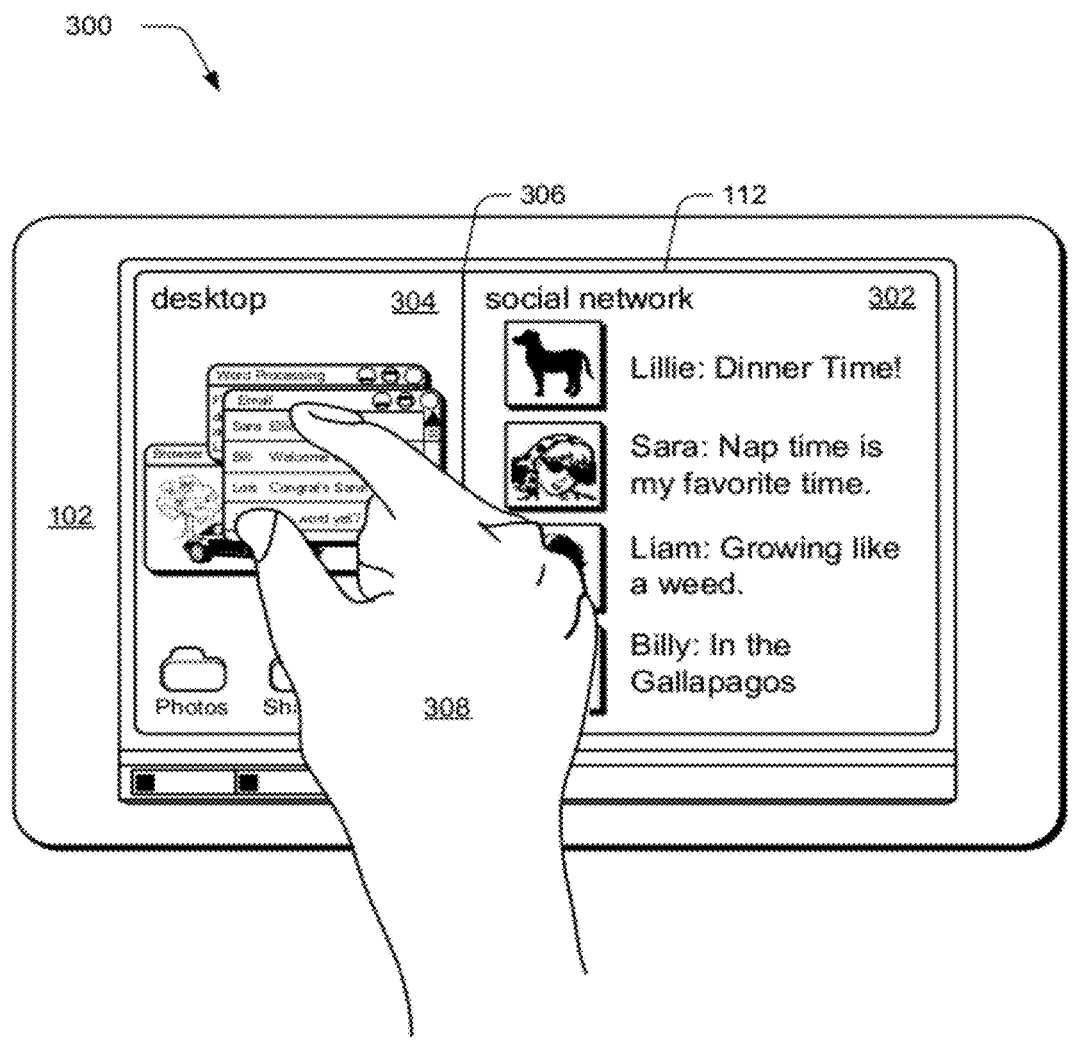
FIG. 3 depicts an example implementation of an immersive shell as outputting data from a social network application and a desktop shell as an immersive application.

FIG. 3 depicts an example implementation 300 of the immersive shell 116 as outputting data from a social network application and providing access to the desktop shell 118 as an immersive application. In this example, a user interface displayed by the display device 112 includes a primary region 302 and a secondary region 304 that are illustrated as rendering data from a social network application and the desktop shell 118, respectively.

The primary and secondary regions 302, 304 are illustrated as being separated by a gutter 306. The gutter 306 may support interaction such that a user may move the gutter 306 to change an amount of display area consumed by the primary and secondary regions 302, 304, respectively. In one or more embodiments, the primary region 302 is configured to consume a larger area of the display device 112 than the secondary region and thus, the primary region may be implemented on any side of the display device 112.

The secondary region 304 may be considered as "docking" or "snapping" a display of data from a corresponding application 110 yet making that display available for view. The use of the primary and secondary regions 302, 304 may also be utilized to support navigation as further described in relation to FIG. 5.

In the illustrated implementation 300 of FIG. 3, a finger of a user's hand 308 is depicted as selecting a window corresponding to an email application in the representation of the desktop shell 118 in the secondary region 304. This may be utilized to programmatically "unsnap" the desktop shell 118 from the secondary region 304 for placement in the primary region 302.

Like the tile 214 that was described previously for the desktop shell 118, the secondary region 304 may also support a range of navigation techniques. For example, a user may select an area within the secondary region 304 but outside of the windows in the region to cause output of the desktop, such as through a cursor control device, gesture, and so on. Additionally, a user may select a particular window within the secondary region 304 to navigate directly to that window in the desktop shell 118, such as by making that window the "primary" window that is displayed "on top" of other windows in the primary region 302 by the desktop shell 118. Thus, secondary region 304 may be utilized to navigate directly to applications that are accessible within the desktop shell 118.

As illustrated in FIG. 3, for instance, a finger of the user's hand 308 is illustrated as selecting a window in the secondary region 304 of the immersive shell 116. Responsive to this selection, the immersive environment module 114 may cause the desktop shell 118 to be displayed in a primary region 302 of the user interface.

Additionally, the immersive environment module 114 may display the window that was selected in the secondary region 304 as ready for user interaction. For example, the window may be selected and given focus and thus inputs received by the computing device 102 are directed to an application 110 that corresponds to the selected window. An example of a result of a selection of the email window in the secondary region 304 is illustrated in relation to the following figure.

Figure 4:
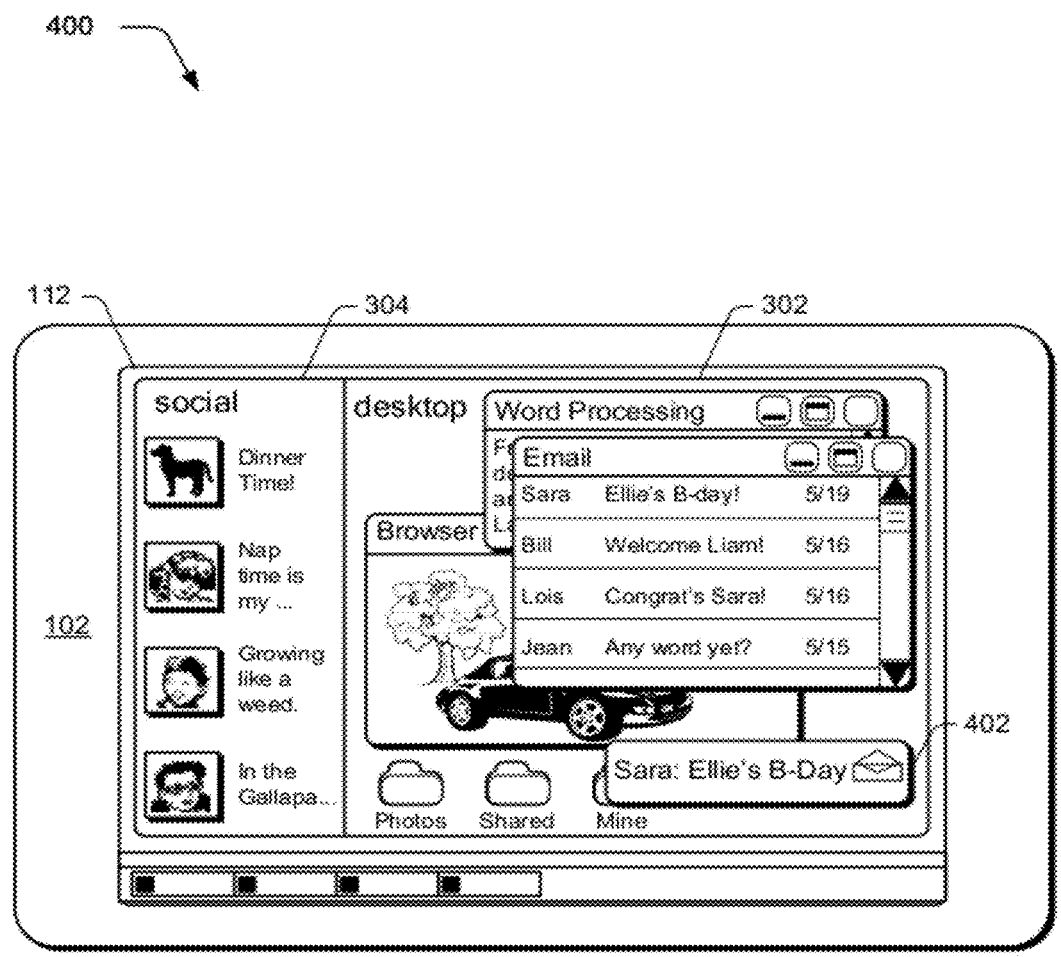
FIG. 4 depicts an example implementation in which a result of selection of a desktop shell in an immersive environment of FIG. 3 from a secondary region for display in a primary region is shown.

FIG. 4 depicts an example implementation 400 in which a result of selection of the desktop shell 118 in an immersive environment of FIG. 3 from a secondary region 304 for display in a primary region 302 is shown. In the illustrated example, the desktop shell 118 is displayed in the primary region of the user interface on the display device 112. Additionally, data rendered from an application that was originally positioned in the primary region 302 of the user interface of FIG. 3 is illustrated as moved to the secondary region 304. Thus, in this example content in the respective portions is "switched" responsive to the selection of FIG. 3.

The example implementation 400 is also illustrated as outputting a notification 402. The notification 402 may include a wide variety of information. For example, when the desktop shell 118 is displayed in the user interface the notification may include information pertaining to execution of applications within the desktop shell 118. An instance of this is illustrated in FIG. 4 as indicating receipt of an email message that describes a sender of the message, e.g., "Sara," and a subject line of the message, e.g., "Ellie's B-day." Thus, the immersive environment module may surface notifications in the desktop shell 118 that pertain to applications that are executed within the shell.

Other notification techniques are also contemplated. For example, the notification 402 may describe execution of other applications that are not currently displayed in the immersive shell 116. For instance, a notification may be displayed that pertains to an application that "resides" in the secondary region 304, is executed "off screen," and so on. In another example, the notification 402 may describe execution of applications within the desktop shell 118 even if the desktop shell 118 is not currently being displayed within the immersive shell 116 on the display device 112. A variety of other examples are also contemplated.

Figure 5:
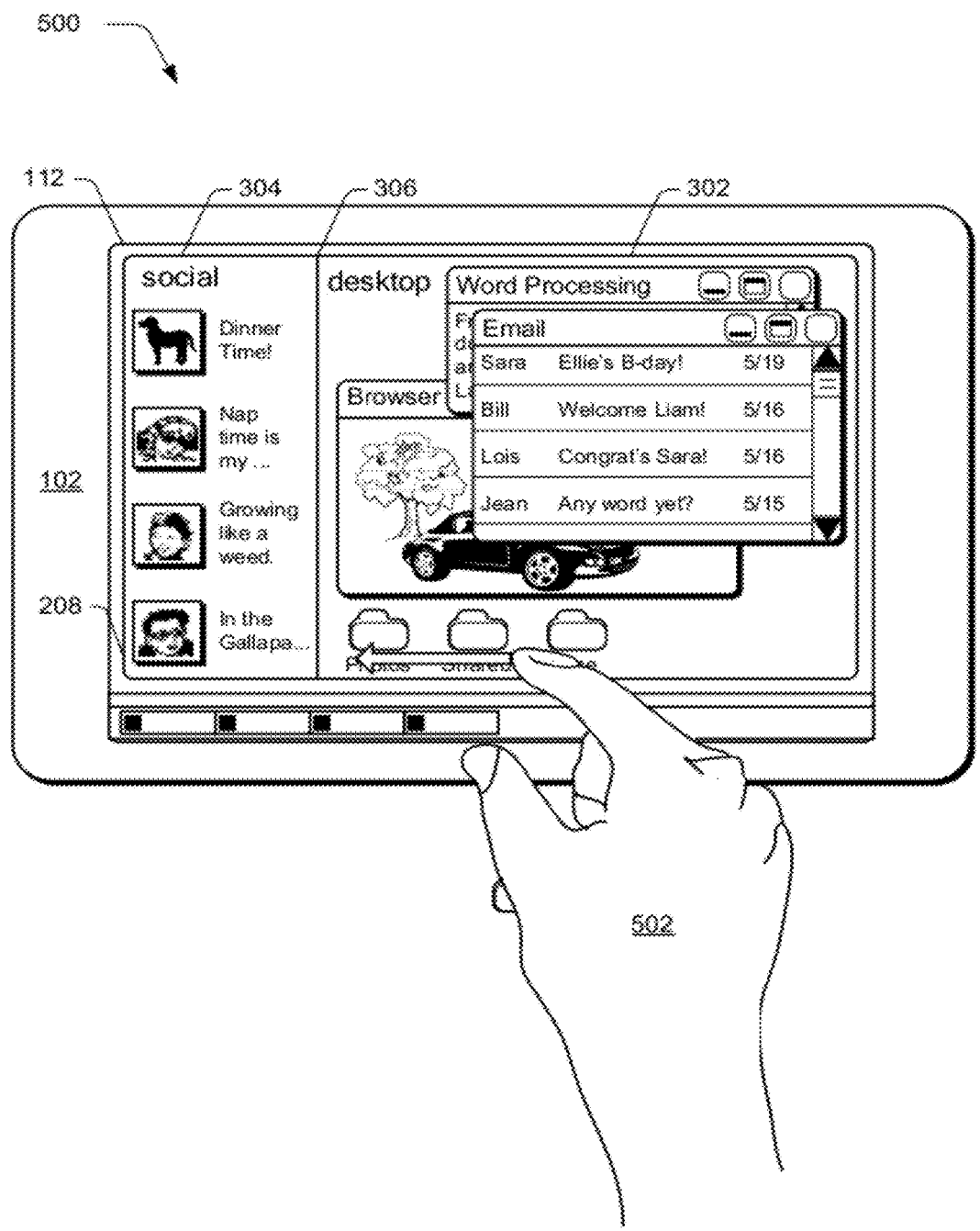
FIG. 5 depicts an example implementation in which a user interface of FIG. 4 is scrolled to navigate in an immersive shell from a desktop shell to an application.

FIG. 5 depicts an example implementation 500 in which a user interface of FIG. 4 is scrolled to navigate in an immersive shell from the desktop shell 118 to an application. In this example, a finger of a user's hand 502 is illustrated as being placed proximal to the display device 112 over the primary region 302. The finger of the user's hand 502 is then illustrated (through using an arrow) as being slid toward the left edge 208 of the display device 112.

In an implementation, this gesture may be recognized by the immersive environment module 114 as indicating that the display of data from the desktop shell 118 is to be placed in the secondary region 304. The placement of the data from the desktop shell 118 in the secondary region 304 may thus replace the data from the application that was previously displayed in that portion, e.g., the data from the social network app as illustrated. This gesture may be continued to navigate through applications that have been selected for execution by a user, e.g., selection of the tiles in FIG. 2.

Thus, the primary and secondary regions 302, 304 of the user interface may be leveraged to navigate through the applications 110 (including the desktop shell 118) to locate a desired application 110 or desktop shell 118 of interest. Although a gesture was described, this operation may be initiated by a variety of inputs, such as a "click-and-drag" from the primary region 302 toward the secondary region 304, an input that describes movement from the primary region 302 over the gutter 306, and so forth. Again, although movement toward the left edge 208 of the display device 102 was described, it should be readily apparent that a wide variety of edges of the display device, gestures, commands, cursor movements, and other inputs may be utilized to initiate the features described above.

Figure 6:
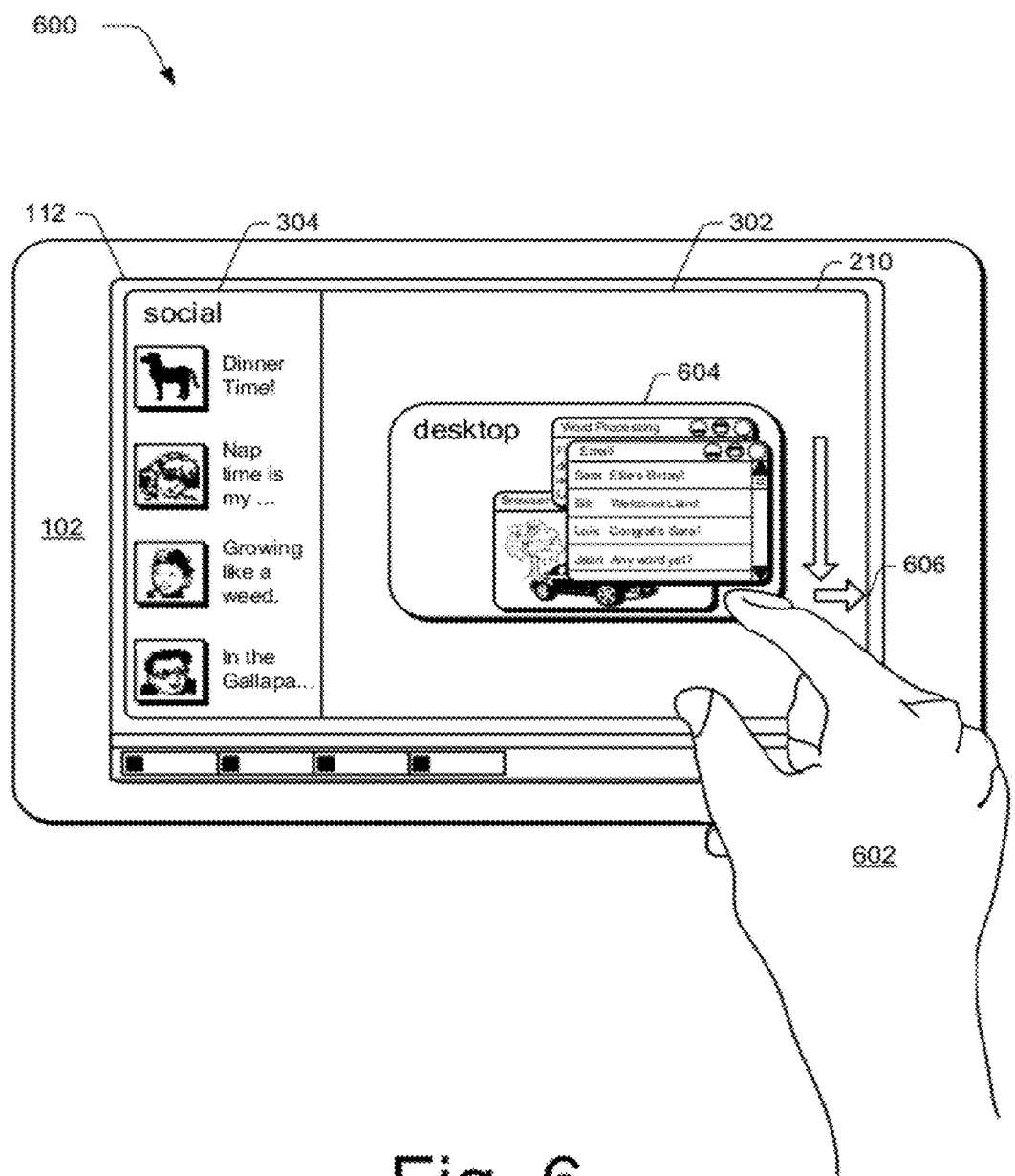
FIG. 6 depicts another example implementation in which a technique is employed to navigate between applications and a desktop shell in an immersive shell.

FIG. 6 depicts another example implementation 600 in which a technique is employed to navigate between applications and a desktop shell 118 in an immersive shell. In this example, a finger of a user's hand 602 is illustrated as being placed proximal to a top edge 210 of the display device 112 in the primary region 302 of the user interface. The immersive environment module 114 may recognize a gesture once the movement has crossed a threshold, e.g., approximately half-way down a display area of the display device 112.

In response to recognizing this gesture, the immersive environment module 114 may generate a reduced display 604 of the data from the desktop shell 118. Further, the immersive environment module 114 may cause this reduced display to follow subsequent movement of the finger of the user's hand 602. Thus, this may indicate to the user that the data from the desktop shell 118 in the reduced display may be repositioned as desired as a secondary region 304 in the user interface.

For example, as illustrated using the arrows an initial part of the gesture may be used to cause the reduced display 604, which is illustrated through use of the relatively long downward arrow. Subsequent movement may then indicate to which edge of the display device 112 the data from the desktop shell 118 is to be "snapped," which in this instance is illustrated as an arrow pointing toward a right edge 606 of the display device 112. Once within a predefined distance, the immersive environment module 114 may cause the display of data from the desktop shell 118 to "snap" toward the corresponding edge using an animation, a result of which is shown in the following figure.

Figure 7:
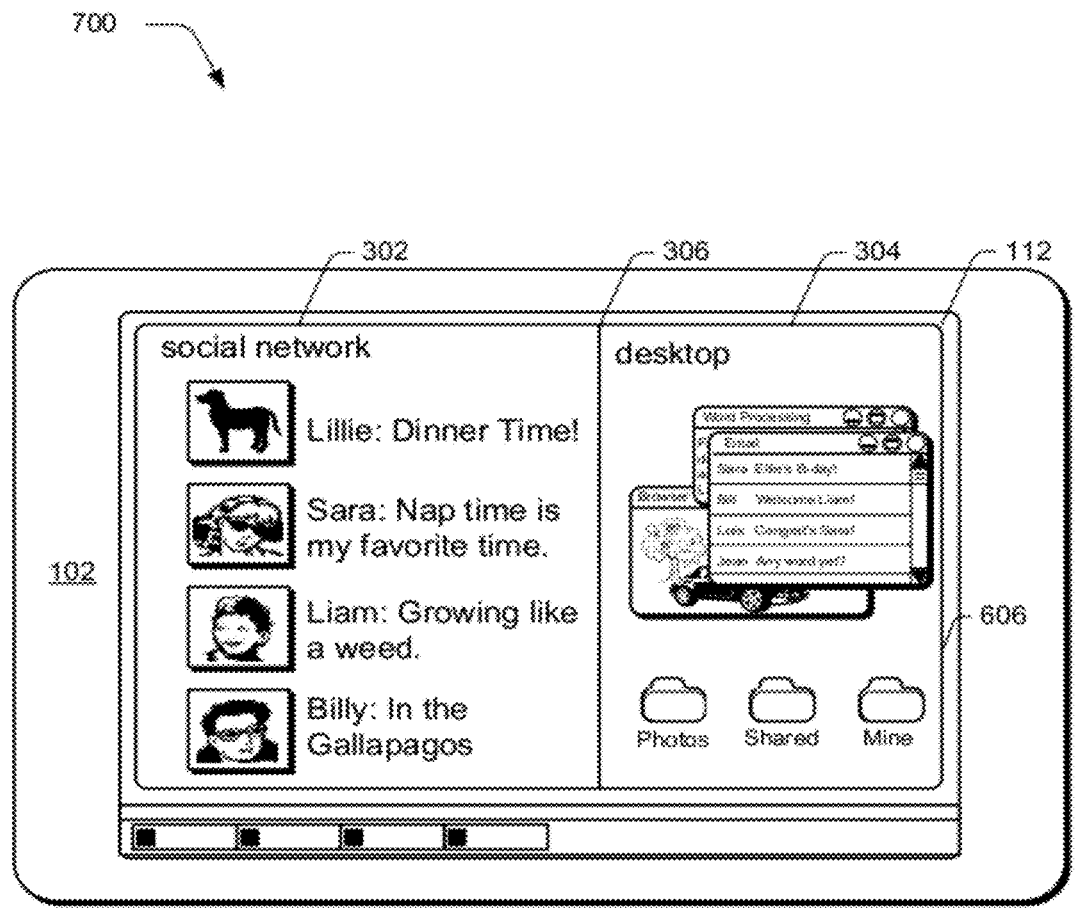
FIG. 7 depicts another example implementation in which a result of the technique of FIG. 6 is shown to navigate between applications and a desktop shell in an immersive shell.

FIG. 7 depicts another example implementation 700 in which a result of the technique of FIG. 6 is shown to navigate between applications 110 and a desktop shell 118 in an immersive shell 116. In this example, a display of data from the desktop shell 118 has been "snapped" to the right edge 606 of the display device 112. This has caused the user interface to be reconfigured such that the data from the social network application is displayed in the primary region 302 of the user interface that is now positioned on the left side of the display device 112. The display of data from the desktop shell 118 is now made a part of the secondary region 304 of the user interface. Thus, this gesture may be used to navigate and/or reposition displays of data from respective applications 110 and for the desktop shell 118. Again, it should be readily apparent that a wide variety of edges of the display device, gestures, commands, cursor movements, and other inputs may be utilized to initiate the features described above.

Figure 8:
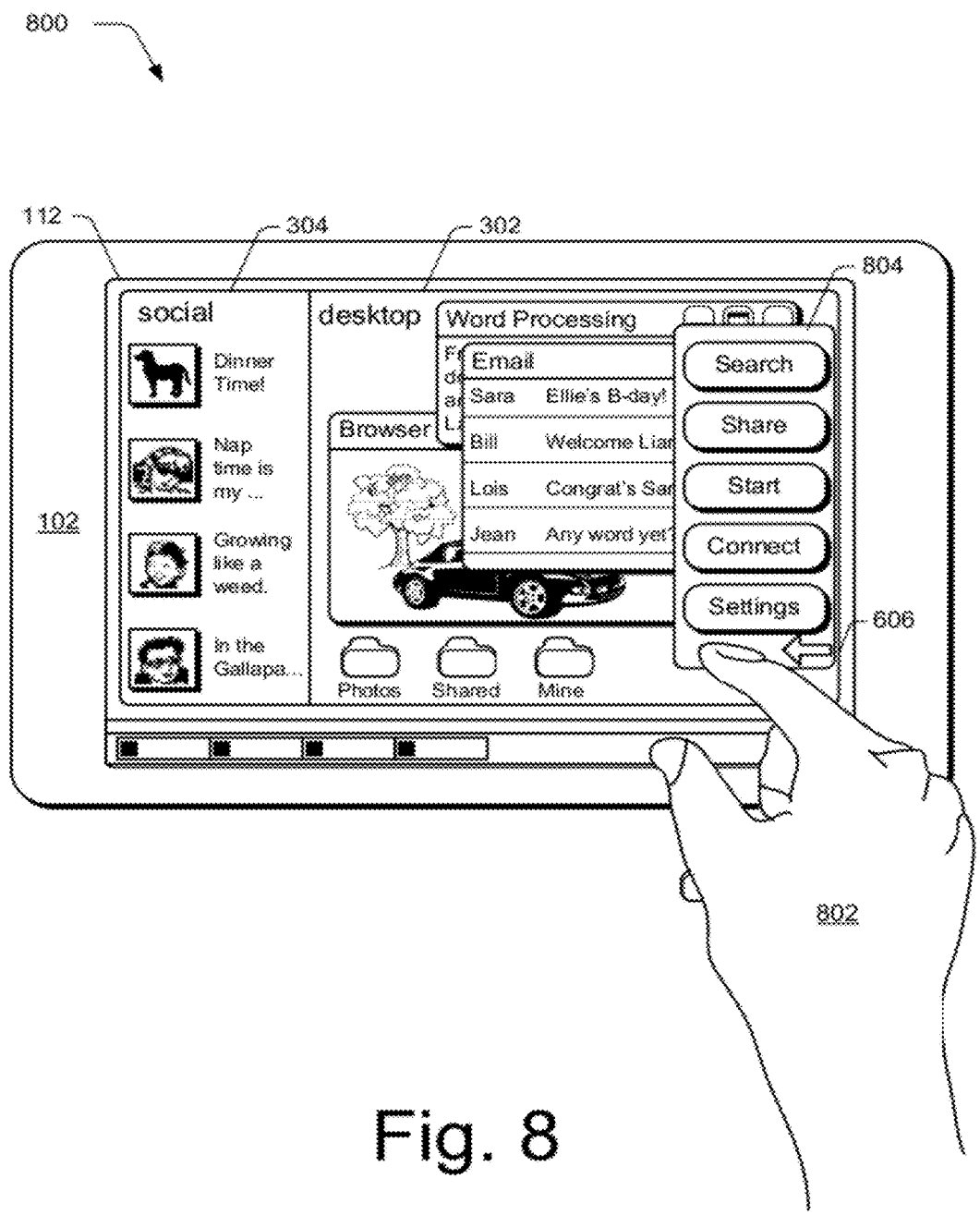
FIG. 8 depicts an example implementation in which a menu is output having commands that may be implemented to a corresponding selection in the immersive shell as a whole.

FIG. 8 depicts an example implementation 800 in which a menu is output having commands that may be implemented to a corresponding selection in the immersive shell 116 as a whole. In this example, a finger of a user's hand 802 is illustrated as being placed proximal to and moved away from the right edge 606 of the display device 112. This input may be detected (e.g., using touchscreen functionality, motion sensors, cameras, and so on) as a gesture to output a "charm" menu 804.

The menu 804 in this example includes representation of commands that may be initiated from both the applications 110 and/or the desktop shell 118 in the immersive shell 116. Examples of such commands are illustrated as including "search," "share," "start," "connect," and "settings." For example, the start representation may be selectable to navigate back to the start screen of FIG. 2. Thus, a user may select a tile from the start screen in FIG. 2, cause data from an application 110 represented by the tile to be output in the user interface, cause output of the menu 804 using a gesture to select the start command, which may cause output of the start screen of FIG. 2 again so that the user may select another application for display in the immersive shell 116.

In one or more implementations, the represented commands are applied to whatever is displayed in the corresponding portion (e.g., primary region 302). Thus, in the illustrated example selection of the "settings" representation may cause output of a menu that relates to settings of the desktop shell 118. A variety of other examples are also contemplated, such as through selection of "share" to communicate a screenshot of the desktop shell 118, "connect" to print, play to, or send the desktop shell 118, "search" to initiate search functionality (e.g., to search the desktop shell 118 and/or the internet), and so forth. Although a gesture involving the right edge 606 of the display device was described in this example, it should be readily apparent that a wide variety of edges of the display device, gestures, commands, cursor movements, and other inputs may be utilized to initiate the features described above.

In one or more implementations, the desktop shell is "aware" of its size in the immersive shell 116 and reacts accordingly, just like immersive applications are aware of their size and react. For example, when the desktop shell 118 is displayed in a secondary region as further described below, it may change its layout and functionality to accommodate the smaller size, which can also be performed by applications that execute within the immersive shell 116. Likewise, when there are two applications onscreen and the desktop shell 118 is in the primary region of the immersive shell 116, the layout may also be changed by the desktop shell 116.

As another example, selecting a maximize button on a window in the desktop shell 118 does not cause that window to try to fill up a full screen of the display device; rather, the desktop shell 118 may "understand" that it has a smaller space to work in, and so the maximized app "fills up" the space allotted to the desktop shell 118 within the primary region. In a further example of the "snap" functionality, where data of an application or desktop shell is dragged to the edges of a screen to resize it to a primary or secondary region. If the desktop shell 118 is currently displayed with data from an application in the immersive shell 116, when the desktop shell 118 is dragged to the boundary between the desktop shell 118 and the application, the desktop shell 118 automatically resizes (even though the cursor is not at the edge of the screen) because desktop shell 118 is aware that the cursor had been dragged to the boundary of the desktop shell 118.

In one or more implementations, the immersive shell 116 may be configured such that applications or the desktop shell 118 that are executed within the immersive shell 116 do not interfere with each other. For instance, if there are two applications onscreen in the immersive shell 116 (but outside the desktop shell 118), then the applications 110 or desktop shell 118 cannot create UI on top of each other and thus are "sandboxed" to their own space on the display device. Thus, the desktop shell 118 is also sandboxed like other applications in the immersive shell 116. A variety of other examples are also contemplated, further discussion of which may be found in relation to the following procedures.

Example Procedures

The following discussion describes immersive application techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2, and example embodiments of FIGS. 3-8, respectively.

Figure 9:
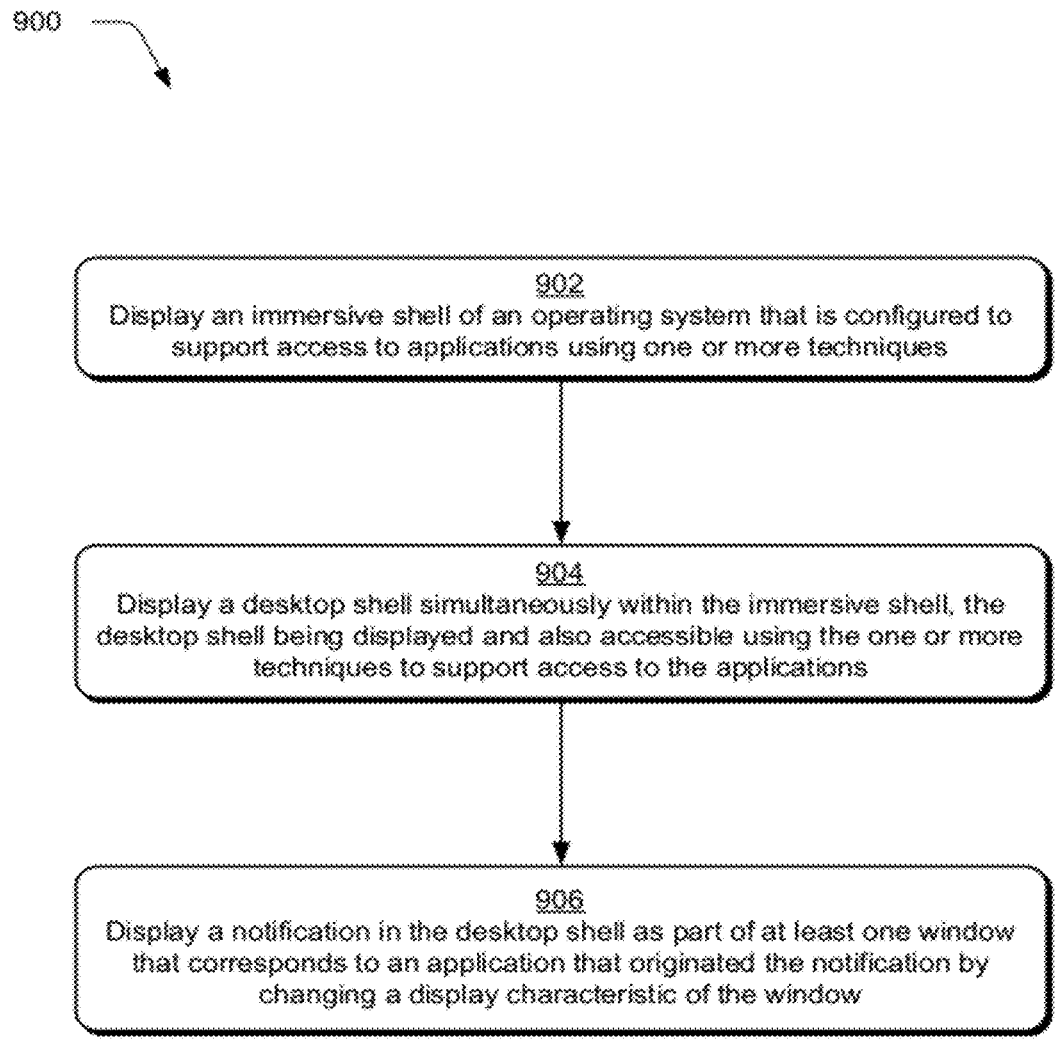
FIG. 9 is a flow diagram depicting a procedure in an example implementation in which a desktop shell is displayed simultaneously within an immersive shell.

FIG. 9 depicts a procedure 900 in an example implementation in which a desktop shell is displayed simultaneously within an immersive shell. An immersive shell is displayed of an operating system that is configured to support access to applications using one or more techniques (block 902). The desktop shell is displayed simultaneously within the immersive shell, the desktop shell being displayed and also accessible using the one or more techniques to support access to the applications (block 904).

For example, the techniques may be configured to treat the desktop shell 118 as an application within the immersive shell 116. These techniques may involve how the desktop shell 118 is display along with the applications 110 in the immersive shell 116, how the desktop shell 118 is accessed within the immersive shell 116 (e.g., navigation between the entities), and so on. As shown in FIGS. 3 and 4, for instance, a display of data from the desktop shell 118 may shown along with a display of data received from an application in the immersive shell 116.

As previously described, the desktop shell 118 may provide a variety of different functionality. The display of the desktop shell 118, for instance, may include a display of a plurality of windows that correspond to a plurality of applications that are executable within the desktop shell as shown. The desktop shell 118 may also include a plurality of representations configured as icons of applications executable within the desktop shell and at least one representation of a folder to support a hierarchical file structure of the computing device 102.

Further, the functionality provided within the desktop shell 118 may differ from the immersive shell 116 such that a user may be exposed to a variety of techniques to interact with the computing device 102. For instance, the desktop shell may employ one or more windows and the immersive shell, absent the desktop shell, is not so configured. In another instance, the desktop shell is configured to employ chrome and a taskbar and the immersive shell, outside of the desktop shell, is not so configured. In a further instance, the desktop shell is configured to support an indication of priority for interaction between the applications using display of depth, e.g., layered windows. In this way, data from one application appears to be displayed over at least a portion of data from another application and the immersive shell, outside of the desktop shell, is not so configured.

The desktop shell may also be used to display a notification in the desktop shell as part of a window that corresponds to an application that originated the notification by changing a display characteristic of the window (block 906). As shown in FIG. 3, for instance, a window may be displayed that corresponds to an email application. In order to output a notification, such as to indicate that a new message has been received, display characteristics of the window itself may be changed, such as to "flash." In this example the desktop shell 118 is docked to an edge of the user interface yet still provides notifications. Thus, if a window becomes "needy" while the desktop shell 118 is docked, the needy state may be indicated in the docked desktop shell using the change in display characteristics, such as those employed by taskbars. In one or more implementations, if the desktop shell 118 is off screen when the window became needy, the desktop shell 118 may be automatically scrolled into view to notify a user. In this example, the change to the display characteristic involves a frame of the window and not content within the window, although other implementation are also contemplated.

Figure 10:
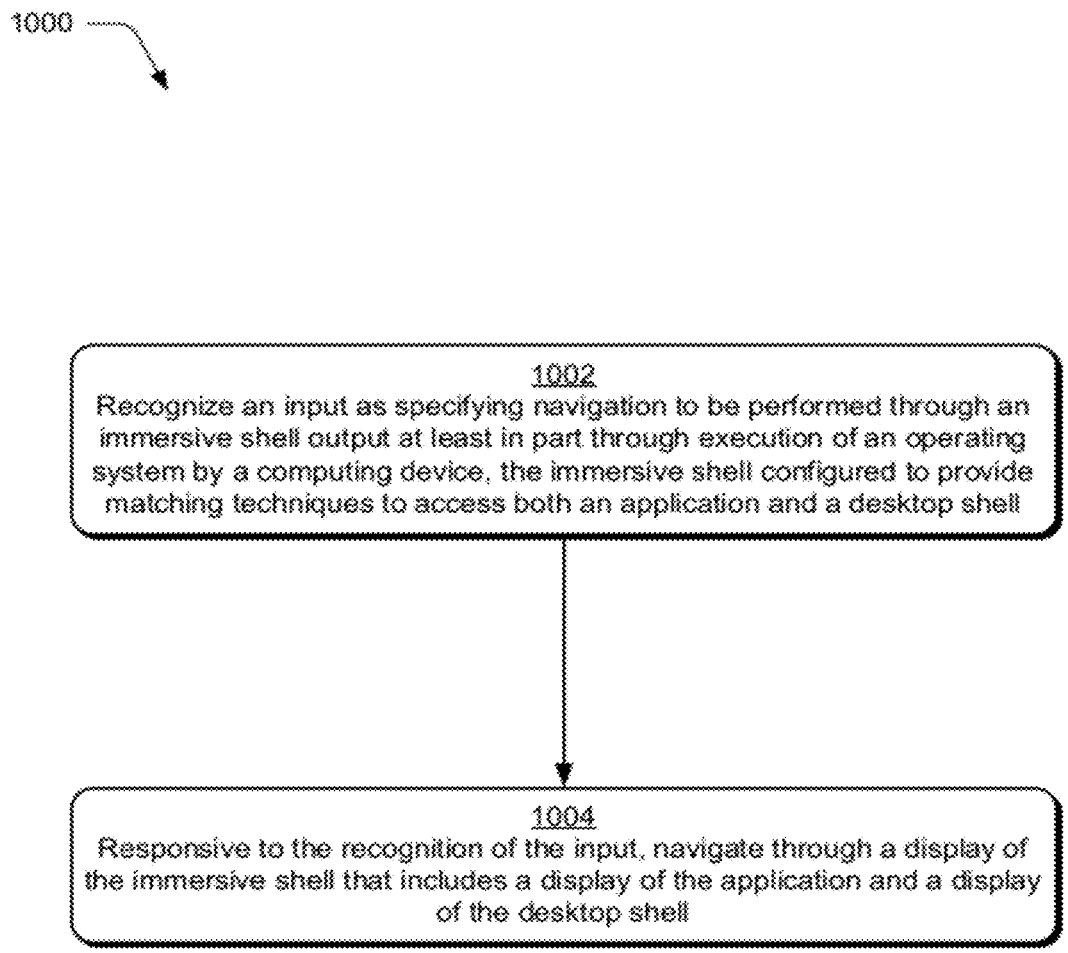
FIG. 10 is a flow diagram depicting a procedure in an example implementation in which navigation is performed through an immersive shell to navigate between applications and a desktop shell.

FIG. 10 depicts a procedure 1000 in an example implementation in which navigation is performed through an immersive shell to navigate between applications and a desktop shell. An input is recognized as specifying navigation to be performed through an immersive shell output at least in part through execution of an operating system by a computing device, the immersive shell configured to provide matching techniques to access both an application and a desktop shell (block 1002). A variety of different inputs may be recognized, such as gestures, inputs received from a cursor control device, and so on. One such input may involve "switching" between primary and secondary regions as described in FIGS. 3 and 4. Another such input may involve repositioning as described in relation to FIGS. 6 and 7.

Responsive to the recognition of the input, display of the immersive shell may be navigated that includes a display of the application and a display of the desktop shell (block 1004). The display in the immersive shell 116, for instance, may be scrolled horizontally to navigate between the applications 110 and the desktop shell 118, may involve a "top edge" gesture, use of the "snapping" techniques, and so on as previously described.

Figure 11:
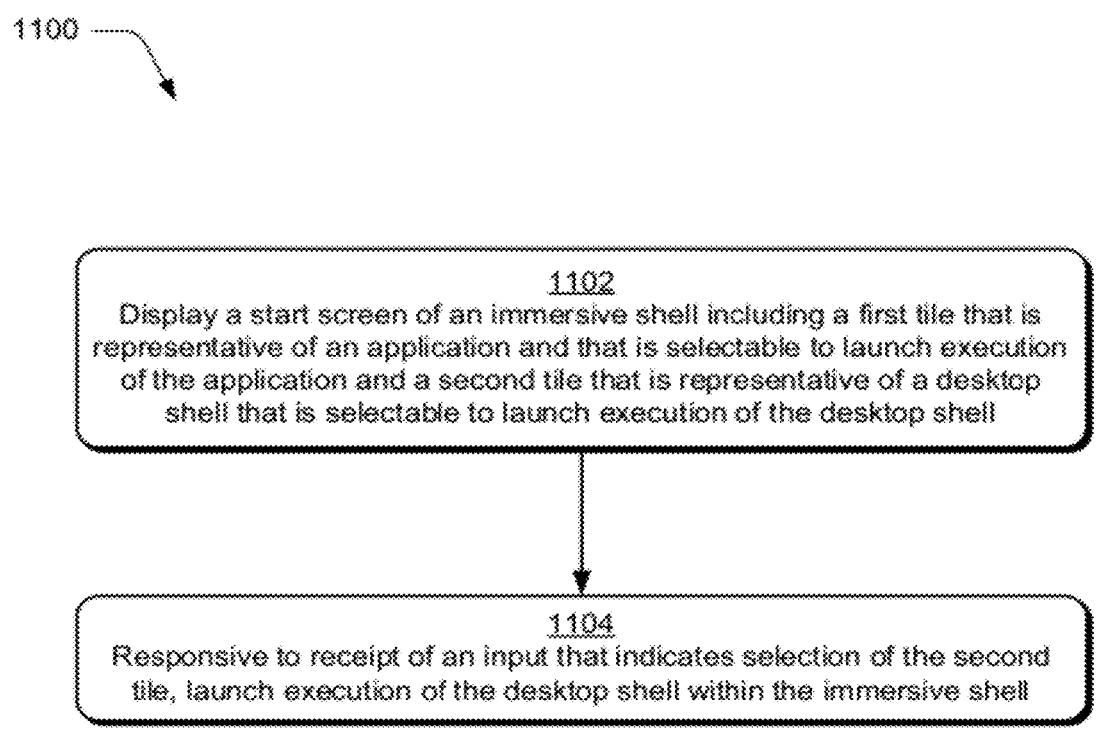
FIG. 11 is a flow diagram depicting a procedure in an example implementation in which a start screen of an immersive shell is displayed that includes a tile representing an application and a tile representing a desktop shell.

FIG. 11 depicts a procedure 1100 in an example implementation in which a start screen of an immersive shell is displayed that includes a tile representing an application and a tile representing a desktop shell. A start screen is displayed of an immersive shell including a first tile that is representative of an application and that is selectable to launch execution of the application and a second tile that is representative of a desktop shell that is selectable to launch execution of the desktop shell (block 1102). As shown in FIG. 2, for instance, a start screen of an immersive shell may include tiles that represent applications. Selection of the tiles may cause a corresponding application to be launched. The immersive environment module 114 may also treat the desktop shell 118 like an application as previously described and thus output a tile 214 that is representative of the desktop shell 118. As shown, the tile 214 may include a "view" of the desktop shell 118 as it would appear if launched, such as to show windows of applications that are to be executed within the desktop shell 118.

Responsive to receipt of an input that indicates selection of the second tile, execution of the desktop shell is launched within the immersive shell (block 1104). The desktop shell 118, for instance, may be launched and displayed in a primary region 302 of a user interface as shown in FIG. 4, may consume an approximate entirety of a display area of the display device like the application in the second stage 204 of FIG. 2, and so forth.

Figure 12:
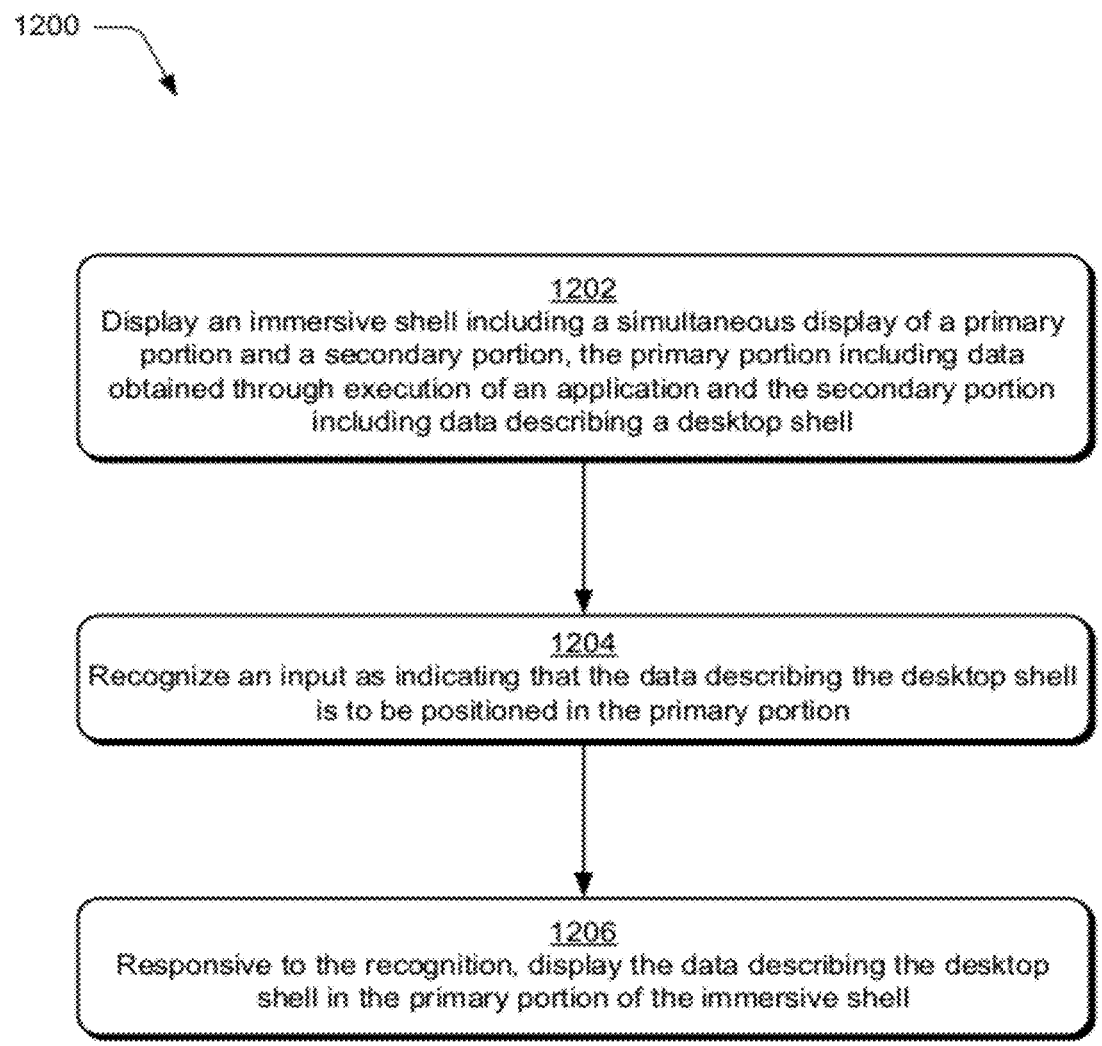
FIG. 12 is a flow diagram depicting a procedure in an example implementation in which an immersive shell includes a primary region, a second portion, and is configured to display and move data generated from the desktop shell in either portion.

FIG. 12 depicts a procedure 1200 in an example implementation in which an immersive shell includes a primary region, a secondary region, and is configured to display and move data generated from the desktop shell in either portion. An immersive shell is displayed including a simultaneous display of a primary region and a secondary region, the primary region including data obtained through execution of an application and the secondary region including data describing a desktop shell (block 1202). As shown in FIG. FIG. 3, for instance, data from a social network application is displayed in a primary region 302 and data from the desktop shell 118 is displayed in the secondary region 304.

An input as indicating that the data describing the desktop shell is to be positioned in the primary region (block 1204). A gesture, for instance, may be recognized as dragging the desktop shell to the primary region 302 of the immersive shell 116. In another instance, a "click-and-drag" command may be received using a mouse. A variety of other instances are also contemplated.

Responsive to the recognition, the data is displayed that describes the desktop shell in the primary region of the immersive shell (block 1206). Additionally, the data that was previously described in the primary region may be switched to the secondary region, may be scrolled off screen to support navigation through the applications and desktop shell in the immersive shell 116, and so forth.

Figure 13:
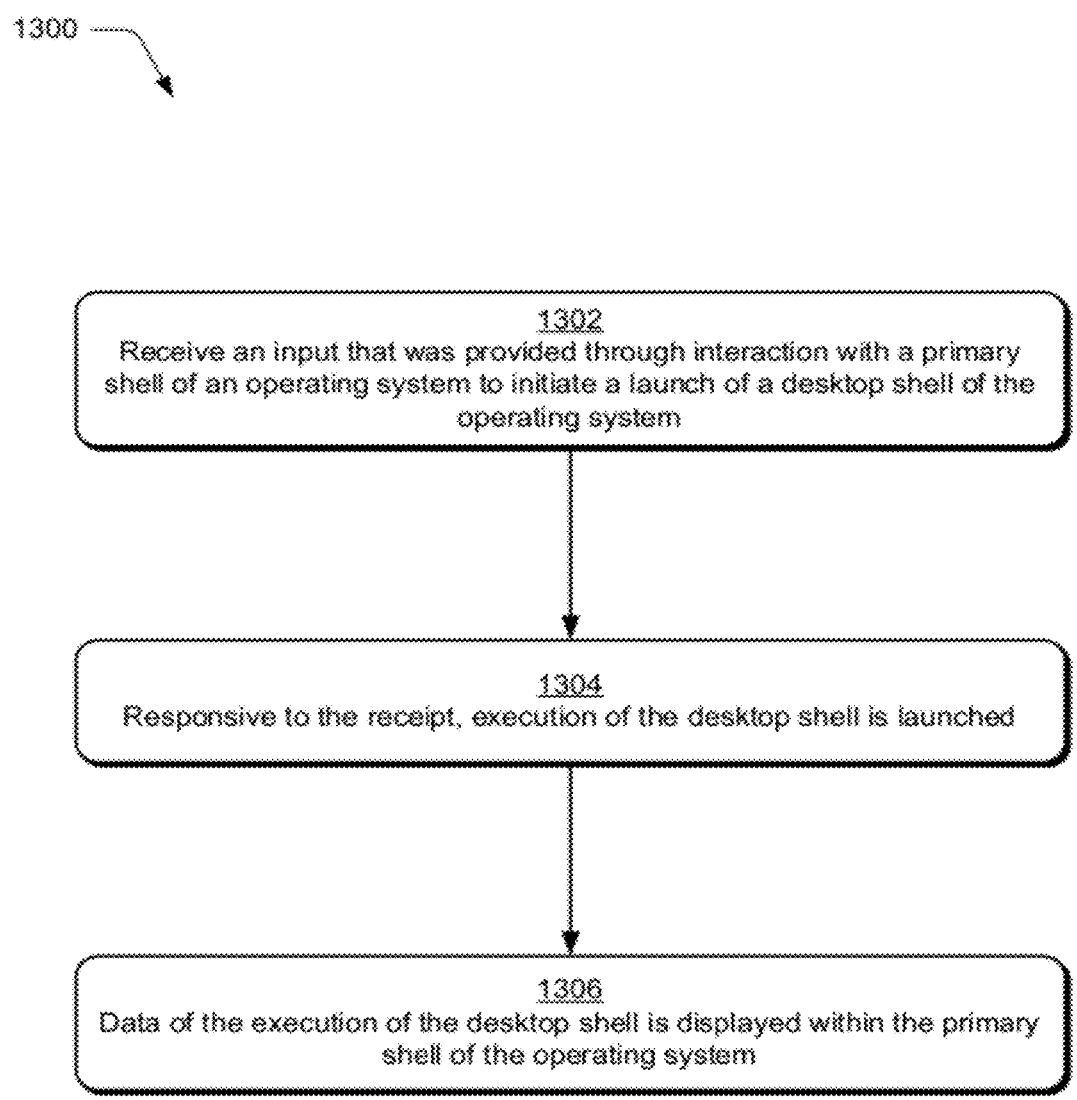
FIG. 13 is a flow diagram depicting a procedure in an example implementation in which execution of a desktop shell is launched within an immersive shell.

FIG. 13 depicts a procedure 1300 in an example implementation in which execution of a desktop shell is launched within an immersive shell. An input is received that was provided through interaction with a primary shell of an operating system to initiate a launch of a desktop shell of the operating system (block 1302). For example, the input may involve selection in a start screen of FIG. 2, selection of a second portion 304 of FIG. 3, scrolling through a display of applications 110 and the desktop shell 118 horizontally through gestures and/or a cursor control device, and so forth.

Responsive to receipt of the input, execution of the desktop shell is launched (block 1304) and data of the execution of the desktop shell is displayed within the primary shell of the operating system (block 1306). For the tile example of FIG. 2, the execution may be launched upon selection of the tile 214 and thus execution of the desktop shell 118 may be suspended beforehand, which may be utilized to conserve resources (e.g., battery, processing, etc.) of the computing device 102. Likewise for the scrolling example, execution of the applications 110 and the desktop shell 118 may be suspended when those entities are off screen. Another embodiment is also contemplated in which execution of the applications 110 but not the desktop shell 118 is suspended when off screen. This data may then be displayed within the primary region 302 of the immersive shell 116 for user interaction, such as to allow a user to reposition windows and interact with application 110 that are executed within the desktop shell 118.

Figure 14:
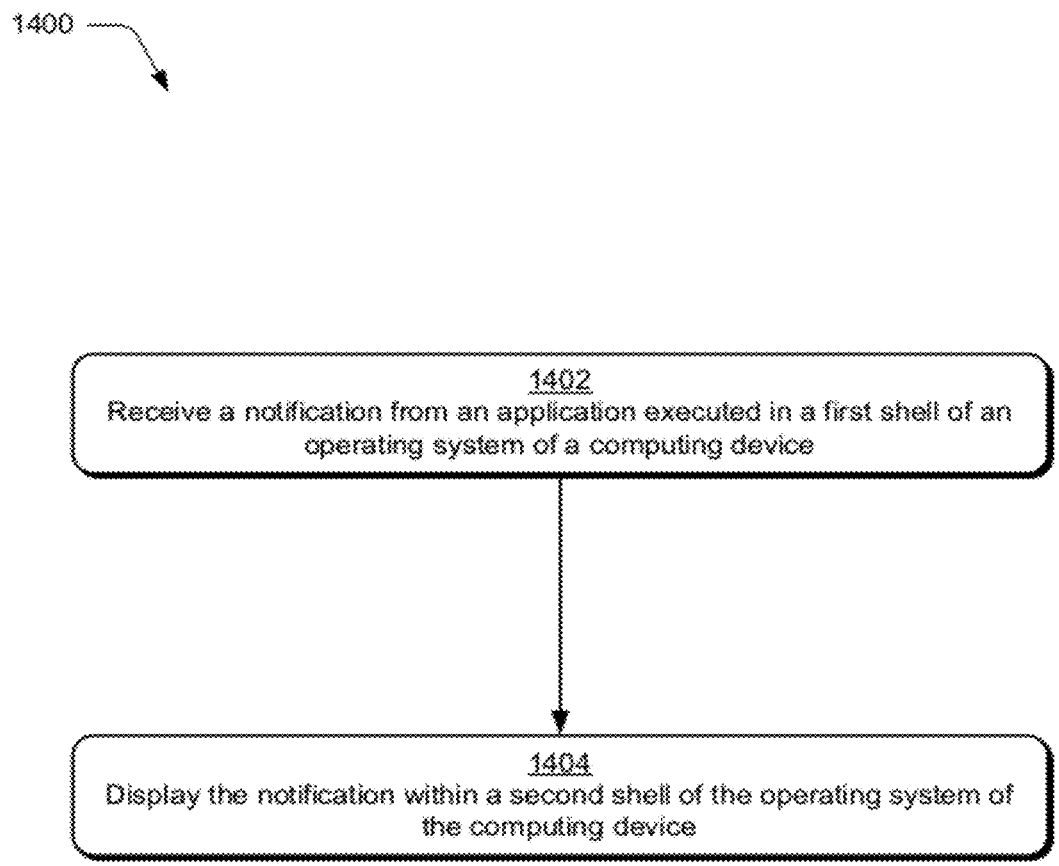
FIG. 14 is a flow diagram depicting a procedure in an example implementation in which notifications from a first shell are displayed in a second shell.

FIG. 14 depicts a procedure 1400 in an example implementation in which notifications from a first shell are displayed in a second shell. A notification is received from an application executed in a first shell of an operating system of a computing device (block 1402). The notification is then displayed within a second shell of the operating system of the computing device (block 1404).

An application, for instance, may be executed within the desktop shell 118 of the operating system 108. The notification may include a variety of different data, such as data that is typically found in a "toast" notification in a computing device, a pop-up window, and so on. In this instance, the application may be executed within the desktop shell 118 "off screen," may be executed when the desktop shell 118 is "snapped" and "docked" to a secondary region of the immersive shell 116, and so forth.

Data from the application may then be displayed in the immersive shell 116 in a variety of ways. For example, the notification may be displayed as a "toast" (e.g., a pop-up that appears for a predefined amount of time), involve an audio output, and so on. In this way, the notification may be used to keep a user aware of "what is going on" in another shell of the operating system.

Figure 15:
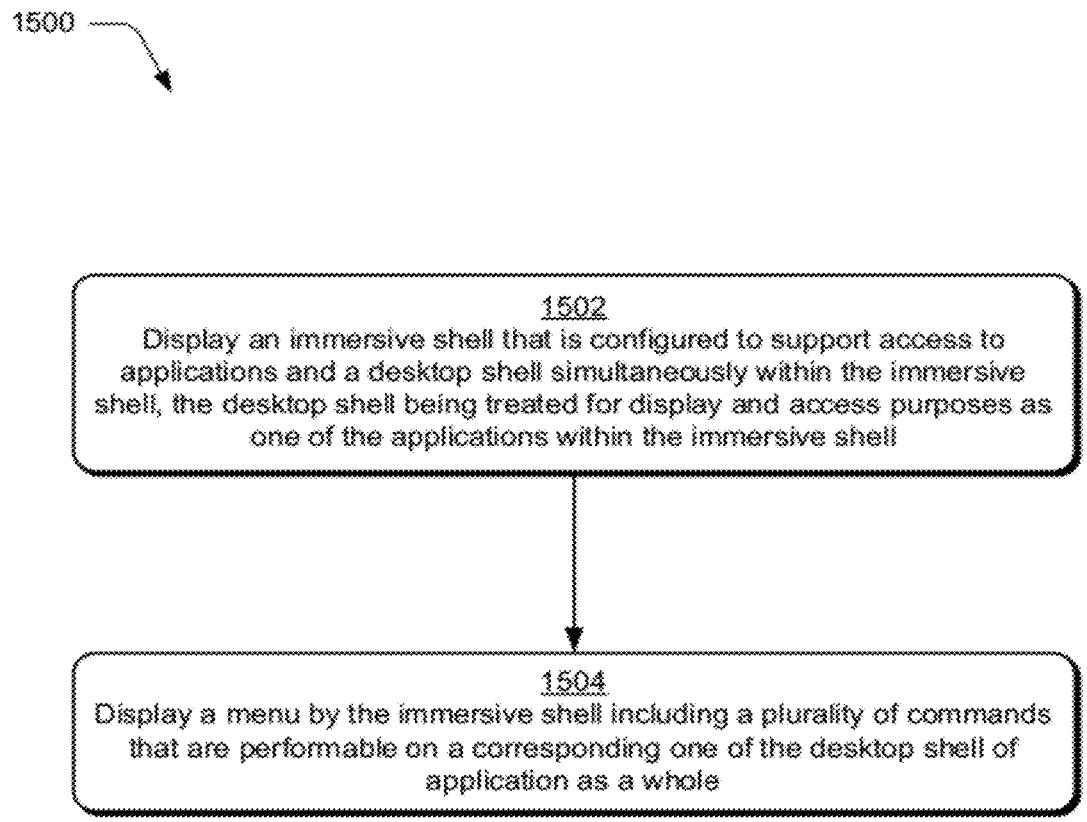
FIG. 15 is a flow diagram depicting a procedure in an example implementation in which a menu of commands are displayed that are applicable to applications and the desktop shell as a whole.

FIG. 15 depicts a procedure 1500 in an example implementation in which a menu of commands is displayed that are applicable to applications and the desktop shell as a whole. An immersive shell is displayed that is configured to support access to applications and a desktop shell simultaneously within the immersive shell, the desktop shell being treated for display and access purposes as one of the applications within the immersive shell (block 1502). A menu is displayed by the immersive shell including a plurality of commands that are performable on a corresponding said desktop shell or application as a whole (block 1504).

As previously described in relation to FIG. 8, a menu 804 may include representation of commands that may be initiated from both the applications 110 and/or the desktop shell 118 in the immersive shell 116. Examples of such commands are illustrated as including "search," "share," "start," "connect," and "settings."

The represented commands may be applied to whatever is displayed in the corresponding portion, which is the primary region 302 in the illustrated example of FIG. 8. Thus, selection of the "settings" representation may cause output of a menu that relates to settings of the desktop shell 118. A variety of other examples are also contemplated, such as through selection of "share" to communicate a screenshot of the desktop shell 118, "connect" to print, play to, or send the desktop shell 118, "search" to initiate search functionality (e.g., to search the desktop shell 118 and/or the internet), and so forth. A variety of other examples are also contemplated without departing from the spirit and scope thereof.

Example System and Device

Figure 16:
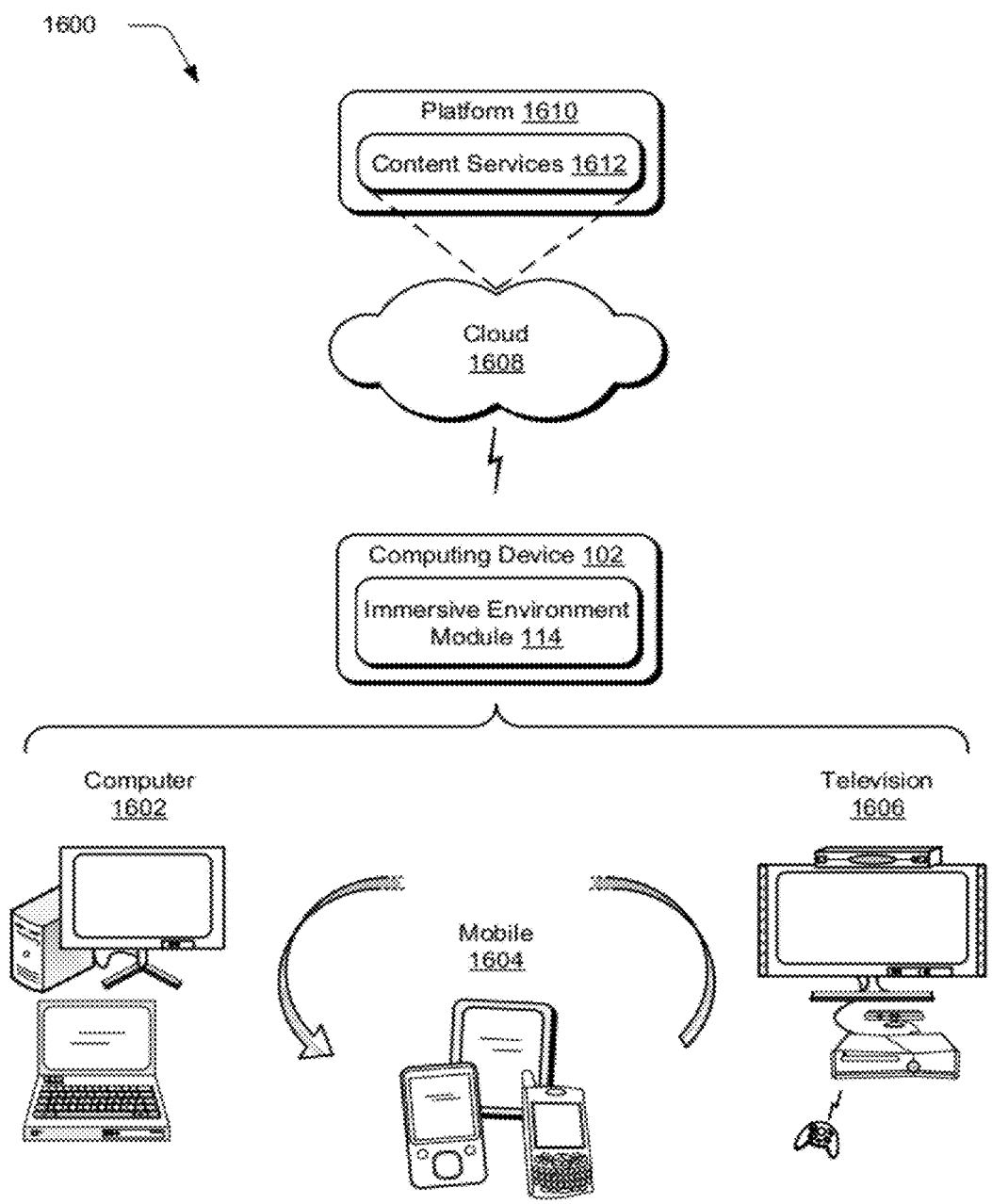
FIG. 16 illustrates an example system that includes the computing device as described with reference to FIG. 1.

FIG. 16 illustrates an example system 1600 that includes the computing device 102 as described with reference to FIG. 1. The example system 1600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 1602, mobile 1604, and television 1606 uses. Each of these configurations includes devices that may have generally different constructs and capabilities, and thus the computing device 102 may be configured according to one or more of the different device classes. For instance, the computing device 102 may be implemented as the computer 1602 class of a device that includes a personal computer, desktop computer, a multi-screen computer, laptop computer, netbook, and so on.

The computing device 102 may also be implemented as the mobile 1602 class of device that includes mobile devices, such as a mobile phone, portable music player, portable gaming device, a tablet computer, a multi-screen computer, and so on. The computing device 102 may also be implemented as the television 1606 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. Thus, the computing device 102 is illustrated as including an immersive environment module 114 that may implement the techniques described herein.

The cloud 1608 includes and/or is representative of a platform 1610 for content services 1612. The platform 1610 abstracts underlying functionality of hardware (e.g., servers) and software resources of the cloud 1608. The content services 1612 may include applications and/or data that can be utilized while computer processing is executed on servers that are remote from the computing device 102. Content services 1612 can be provided as a service over the Internet and/or through a subscriber network, such as a cellular or Wi-Fi network.

The platform 1610 may abstract resources and functions to connect the computing device 102 with other computing devices. The platform 1610 may also serve to abstract scaling of resources to provide a corresponding level of scale to encountered demand for the content services 1612 that are implemented via the platform 1610. Accordingly, in an interconnected device embodiment, implementation of functionality described herein may be distributed throughout the system 1600. For example, the functionality may be implemented in part on the computing device 102 as well as via the platform 1610 that abstracts the functionality of the cloud 1608. In other words, the platform 1610 may be utilized to implement all or a part of the functionality of the immersive environment module 114, e.g., this functionality may be distributed between the platform 1610 and the computing device 102

Figure 17:
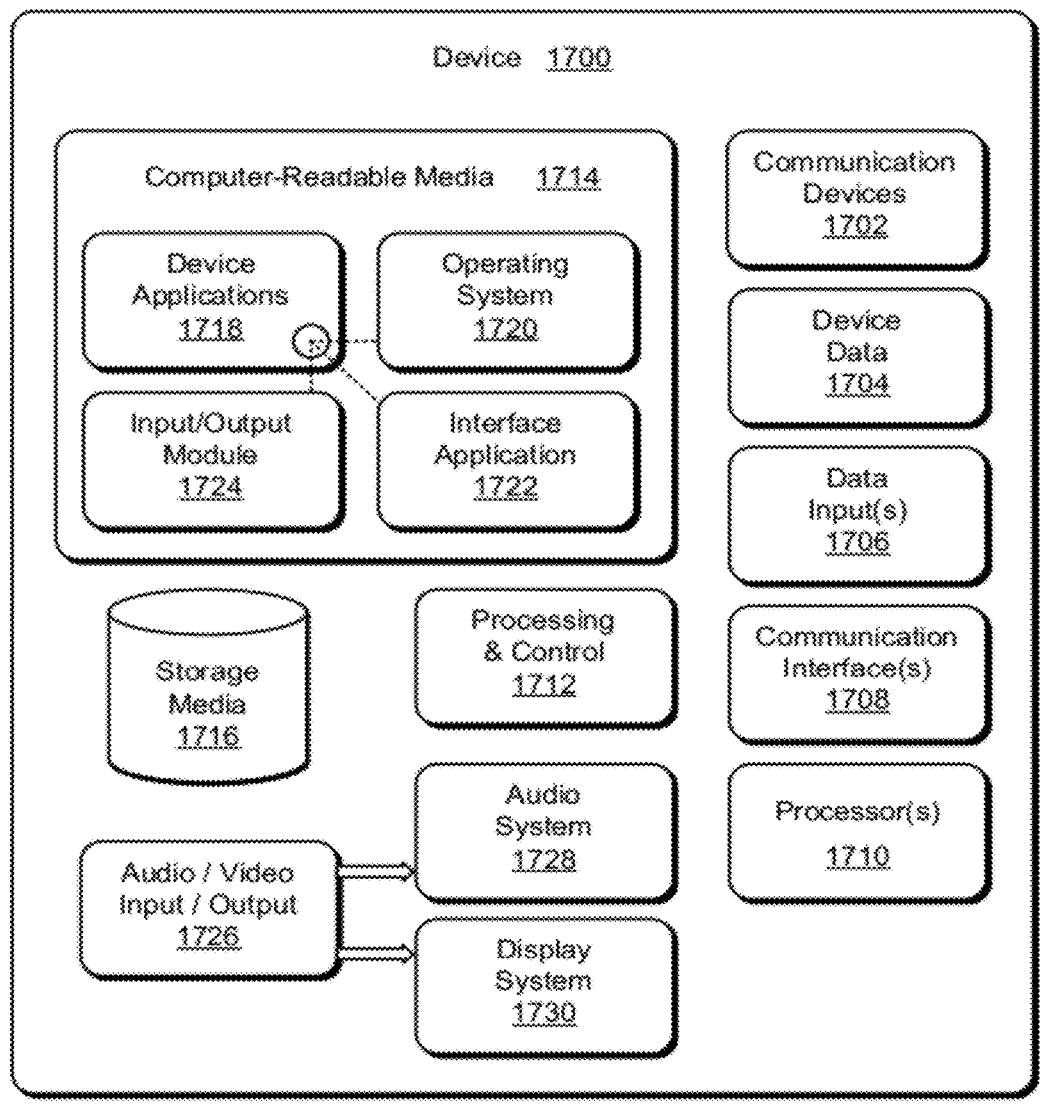
FIG. 17 illustrates various components of an example device that can be implemented as any type of computing device as described with reference to FIGS. 1-8 and 16 to implement embodiments of the techniques described herein.

FIG. 17 illustrates various components of an example device 1700 that can be implemented as any type of computing device as described with reference to FIGS. 1, 2, and 16 to implement embodiments of the techniques described herein. Device 1700 includes communication devices 1702 that enable wired and/or wireless communication of device data 1704 (e.g., received data, data that is being received, data scheduled for broadcast, data packets of the data, etc.). The device data 1704 or other device content can include configuration settings of the device, media content stored on the device, and/or information associated with a user of the device. Media content stored on device 1700 can include any type of audio, video, and/or image data. Device 1700 includes one or more data inputs 1706 via which any type of data, media content, and/or inputs can be received, such as user-selectable inputs, messages, music, television media content, recorded video content, and any other type of audio, video, and/or image data received from any content and/or data source.

Device 1700 also includes communication interfaces 1708 that can be implemented as any one or more of a serial and/or parallel interface, a wireless interface, any type of network interface, a modem, and as any other type of communication interface. The communication interfaces 1708 provide a connection and/or communication links between device 1700 and a communication network by which other electronic, computing, and communication devices communicate data with device 1700.

Device 1700 includes one or more processors 1710 (e.g., any of microprocessors, controllers, and the like) which process various computer-executable instructions to control the operation of device 1700 and to implement embodiments of the techniques described herein. Alternatively or in addition, device 1700 can be implemented with any one or combination of hardware, firmware, or fixed logic circuitry that is implemented in connection with processing and control circuits which are generally identified at 1712. Although not shown, device 1700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1700 also includes computer-readable media 1714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1700 can also include a mass storage media device 1716.

Computer-readable media 1714 provides data storage mechanisms to store the device data 1704, as well as various device applications 1718 and any other types of information and/or data related to operational aspects of device 1700. For example, an operating system 1720 can be maintained as a computer application with the computer-readable media 1714 and executed on processors 1710. The device applications 1718 can include a device manager (e.g., a control application, software application, signal processing and control module, code that is native to a particular device, a hardware abstraction layer for a particular device, etc.). The device applications 1718 also include any system components or modules to implement embodiments of the techniques described herein. In this example, the device applications 1718 include an interface application 1722 and an input/output module 1724 (which may be the same or different as input/output module 114) that are shown as software modules and/or computer applications. The input/output module 1724 is representative of software that is used to provide an interface with a device configured to capture inputs, such as a touchscreen, track pad, camera, microphone, and so on. Alternatively or in addition, the interface application 1722 and the input/output module 1724 can be implemented as hardware, software, firmware, or any combination thereof. Additionally, the input/output module 1724 may be configured to support multiple input devices, such as separate devices to capture visual and audio inputs, respectively.

Device 1700 also includes an audio and/or video input-output system 1726 that provides audio data to an audio system 1728 and/or provides video data to a display system 1730. The audio system 1728 and/or the display system 1730 can include any devices that process, display, and/or otherwise render audio, video, and image data. Video signals and audio signals can be communicated from device 1700 to an audio device and/or to a display device via an RF (radio frequency) link, S-video link, composite video link, component video link, DVI (digital video interface), analog audio connection, or other similar communication link. In an embodiment, the audio system 1728 and/or the display system 1730 are implemented as external components to device 1700. Alternatively, the audio system 1728 and/or the display system 1730 are implemented as integrated components of example device 1700.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising
    displaying a start screen of an immersive shell including
        a first tile that is representative of an application and that is selectable to launch execution of the application and a second tile that is representative of a desktop shell of an operating system that is selectable to launch execution of the desktop shell, the desktop shell configured to support access to one or more windowed representations of applications;
    responsive to receipt of an input that indicates selection of the second tile, launching execution of the desktop shell of the operating system within the immersive shell; and
    responsive to receipt of an input that indicates selection of the first tile, launching execution of the application such that the application is executed, within the immersive shell and outside the desktop shell, and displayed without framing the application with a window.

2. A method as described in claim 1, wherein the second tile includes representations of one or more applications that are executed within the desktop shell.

3. A method as described in claim 2, wherein the representations of the one or more applications include windows having data generated through execution of respective said applications.

4. A method as described in claim 2, wherein the representations of the one or more applications are selectable to navigate directly to a corresponding said application.

5. A method as described in claim 1, further comprising displaying data that results from execution of the desktop shell within the immersive shell.

6. A method as described in claim 5, wherein the displaying of data that results from execution of the desktop shell within the immersive shell is performed concurrently with displaying the application executing outside of the desktop shell and within the immersive shell.

7. A method as described in claim 5, wherein the displaying of the desktop shell includes displaying a splash screen.

8. A method as described in claim 5, wherein:
    the desktop shell employs one or more windows and the immersive shell, absent the desktop shell, is not so configured; and
    the desktop shell is configured to employ chrome and the immersive shell, outside of the desktop shell, is not so configured.

9. A method as described in claim 5, wherein the desktop shell is configured to include a task bar and the immersive shell, outside of the desktop shell, is not so configured.

10. A method as described in claim 5, wherein the desktop shell is configured to support a display of depth such that data from one application appears to be displayed over at least a portion of data from another said application and the immersive shell, outside of the desktop shell, is not so configured.

11. A method implemented by one or more computing devices, the method comprising:
    displaying an immersive shell including a simultaneous display of:
        a primary region including data obtained through execution of an application, such that the data obtained through execution of the application is not framed with a window; and
        a secondary region including data describing a desktop shell that is configured to support interactions with one or more windowed representations of applications, the interactions with the one or more windowed representations of applications being limited from the immersive shell to interactions performed through the desktop shell;
    recognizing an input as indicating that the data describing the desktop shell is to be positioned in the primary region; and
    responsive to the recognizing, displaying the data describing the desktop shell in the primary region of the immersive shell.

12. A method as described in claim 11, wherein the displaying responsive to the recognizing further comprises displaying the data obtained through execution of the application in the secondary region.

13. A method as described in claim 11, wherein the displaying responsive to the recognizing further comprises displaying data obtained through execution of another application in the secondary region.

14. A method as described in claim 13, wherein the displaying responsive to the recognizing further comprises ceasing the display of the data obtained from the application and the execution of the application.

15. A method as described in claim 11, wherein the data describing the desktop shell includes a display of a plurality of windows that correspond to a plurality of applications that are executable within the desktop shell.

16. A method as described in claim 15, wherein each of the plurality of windows is selectable in the display in the secondary region to navigate directly to the window in the desktop shell.

17. A method as described in claim 11, wherein the simultaneous display of the primary region and secondary region is configured such that the simultaneous display consumes substantially all of the immersive shell.

18. A method implemented by one or more computing devices, the method comprising:
    receiving an input provided through interaction with a primary shell of an operating system to initiate a launch of a desktop shell of the operating system that provides access to desktop functionality for the primary shell;
    responsive to the receiving, launching execution of the desktop shell; and
    displaying data of the execution of the desktop shell within the primary shell of the operating system; and
    concurrently displaying data corresponding to an application executing inside of the primary shell and outside of the desktop shell, the display configured such that the data corresponding to the application is not framed with a window.

19. A method as described in claim 18, wherein the input involves a cursor control device or recognition of a gesture.

20. A method as described in claim 18, wherein the primary shell is configured as an immersive shell and wherein:
    the desktop shell is configured to display a plurality of windows that correspond to a plurality of applications that are executable within the desktop shell;
    the desktop shell is configured to employ chrome and the immersive shell, outside of the desktop shell, is not so configured;
    the desktop shell is configured to include a task bar and the immersive shell, outside of the desktop shell, is not so configured;
    the desktop shell is configured to support a display of depth such that data from one application appears to be displayed over at least a portion of data from another said application and the immersive shell, outside of the desktop shell, is not so configured; and
    the desktop shell includes a plurality of representations configured as icons of applications executable within the desktop shell and at least one representation of a folder to support a hierarchical file structure of the computing device.

* * * * *